(12) United States Patent
Belousova et al.

(10) Patent No.: US 11,687,992 B2
(45) Date of Patent: *Jun. 27, 2023

(54) SYSTEM AND METHOD FOR PROVIDING FOOD TAXONOMY BASED FOOD SEARCH AND RECOMMENDATION

(71) Applicant: GrubHub Holdings, Inc., Chicago, IL (US)

(72) Inventors: Maria Belousova, New York, NY (US); Eric Farng, New York, NY (US); Justin Charles Bozonier, Chicago, IL (US); Thomas Eugene Hayden, III, Evanston, IL (US); Matthew Maloney, Chicago, IL (US)

(73) Assignee: GRUBHUB HOLDINGS INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,639

(22) Filed: Apr. 26, 2021

(65) Prior Publication Data
US 2022/0084096 A1    Mar. 17, 2022

Related U.S. Application Data

(63) Continuation of application No. 16/453,889, filed on Jun. 26, 2019, now Pat. No. 10,991,025, which is a
(Continued)

(51) Int. Cl.
*G06F 15/16* (2006.01)
*G06Q 30/06* (2023.01)
(Continued)

(52) U.S. Cl.
CPC ......... *G06Q 30/0627* (2013.01); *G06Q 50/12* (2013.01)

(58) Field of Classification Search
CPC ..................... G06Q 30/0627; G06Q 50/12
See application file for complete search history.

(56) References Cited

U.S. PATENT DOCUMENTS

| | | |
|---|---|---|
| 4,530,067 A | 7/1985 | Dorr |
| 4,547,851 A | 10/1985 | Kurland |

(Continued)

FOREIGN PATENT DOCUMENTS

| | | |
|---|---|---|
| EP | 0 844 579 | 5/1998 |
| EP | 0856 812 | 5/1998 |

(Continued)

OTHER PUBLICATIONS

Compuware Technologies Approved as Supplier to McDonald's Canada, Compuwave Technologies Inc., Sep. 14, 2000.
(Continued)

*Primary Examiner* — Talia F Crawley
(74) *Attorney, Agent, or Firm* — Baker Botts L.L.P.

(57) ABSTRACT

A restaurant service system includes a restaurant server adapted to communicate with diner communication devices and restaurant communication devices. The restaurant server builds a food taxonomy including dishes, dish attributes and dish ingredients. The dishes are mapped from menu items. The server also trains dish classifiers and applies the dish classifiers to map menu items to dishes. Dish attributes are derived from search logs and dish ingredients are extracted from menu item descriptions. The server determines the search intent of a diner based on her search terms. Food search is conducted based on the taxonomy and the search intent with consideration of restaurant similarity and dish popularity. The server also provides dish recommendations based on taste similarity between diners.

20 Claims, 20 Drawing Sheets

Related U.S. Application Data continuation of application No. 14/520,901, filed on Oct. 22, 2014, now Pat. No. 10,366,434.

(51) Int. Cl.
  *G06Q 50/12* (2012.01)
  *G06Q 30/0601* (2023.01)

(56) References Cited

U.S. PATENT DOCUMENTS

| | | |
|---|---|---|
| 5,189,411 A | 2/1993 | Collar |
| 5,272,474 A | 12/1993 | Hilliard |
| 5,367,557 A | 11/1994 | Ozenbaugh |
| 5,510,979 A | 4/1996 | Moderi |
| 5,570,283 A | 10/1996 | Shoolery |
| 5,745,681 A | 4/1998 | Levine |
| 5,751,958 A | 5/1998 | Zweben |
| 5,774,670 A | 6/1998 | Montulli |
| 5,781,189 A | 7/1998 | Holleran |
| 5,835,896 A | 11/1998 | Fisher |
| 5,838,798 A | 11/1998 | Stevens |
| 5,839,115 A | 11/1998 | Coleman |
| 5,842,176 A | 11/1998 | Hunt |
| 5,845,263 A | 12/1998 | Camaisa |
| 5,850,214 A | 12/1998 | McNally |
| 5,899,502 A * | 5/1999 | Del Giorno ............ G06Q 99/00 283/67 |
| 5,912,743 A | 6/1999 | Kinebuchi |
| 5,948,040 A | 9/1999 | DeLorme |
| 5,966,068 A | 10/1999 | Wicks |
| 5,970,474 A | 10/1999 | LeRoy |
| 5,991,739 A * | 11/1999 | Cupps .................... G06Q 30/06 705/37 |
| 6,134,548 A | 10/2000 | Gottsman |
| 6,167,255 A | 12/2000 | Kennedy |
| 6,175,922 B1 | 1/2001 | Wang |
| 6,208,976 B1 | 3/2001 | Kinebuchi |
| 6,236,974 B1 | 5/2001 | Kolawa |
| 6,282,491 B1 | 8/2001 | Bochmann |
| 6,295,541 B1 | 9/2001 | Bodnar |
| 6,300,947 B1 | 10/2001 | Kanevsky |
| 6,341,268 B2 | 1/2002 | Walker |
| 6,356,543 B2 | 3/2002 | Hall |
| 6,366,650 B1 | 4/2002 | Kyung |
| 6,384,850 B1 | 5/2002 | McNally et al. |
| 6,415,138 B2 | 7/2002 | Sirola |
| 6,590,588 B2 | 7/2003 | Lincke |
| 6,594,347 B1 | 7/2003 | Calder |
| 6,836,537 B1 | 12/2004 | Zirngibl |
| 6,871,325 B1 | 3/2005 | McNally et al. |
| 6,873,693 B1 | 3/2005 | Langseth |
| 6,973,437 B1 | 12/2005 | Olewicz |
| 6,976,004 B2 | 12/2005 | Wittrup |
| 6,982,733 B1 | 1/2006 | McNally et al. |
| 7,069,228 B1 | 6/2006 | Rose |
| 7,216,152 B2 | 5/2007 | Short |
| 7,277,717 B1 | 10/2007 | Hart |
| 7,295,920 B2 | 11/2007 | Finkelstein |
| 7,359,871 B1 | 4/2008 | Paasche |
| 7,386,477 B2 | 6/2008 | Fano |
| 7,437,305 B1 | 10/2008 | Kantarjiev |
| 7,505,929 B2 | 3/2009 | Angert |
| 7,680,690 B1 | 3/2010 | Catalano |
| 7,953,873 B1 * | 5/2011 | Madurzak ............ G06Q 30/02 709/229 |
| 7,966,215 B1 | 6/2011 | Myers |
| 8,073,723 B1 | 12/2011 | Bilibin et al. |
| 8,146,077 B2 | 3/2012 | McNally et al. |
| 8,326,705 B2 | 12/2012 | Niessen et al. |
| 8,341,003 B1 | 12/2012 | Bilibin et al. |
| 8,577,823 B1 * | 11/2013 | Gadir .................... G06N 5/025 706/45 |
| 8,595,050 B2 | 11/2013 | Scotto et al. |
| 2001/0047301 A1 | 11/2001 | Walker |
| 2002/0005430 A1 | 1/2002 | Pentel |
| 2002/0046093 A1 | 4/2002 | Miller |
| 2002/0107747 A1 * | 8/2002 | Gerogianni ............ G06Q 30/06 705/26.8 |
| 2002/0143655 A1 | 10/2002 | Elston |
| 2002/0161604 A1 | 10/2002 | Kardos |
| 2002/0178034 A1 | 11/2002 | Gardner |
| 2003/0125963 A1 | 7/2003 | Haken |
| 2005/0004843 A1 | 1/2005 | Heflin |
| 2005/0049940 A1 | 3/2005 | Tengler |
| 2006/0010037 A1 | 1/2006 | Angert et al. |
| 2006/0020497 A1 | 1/2006 | Mcnally |
| 2006/0020614 A1 * | 1/2006 | Kolawa .................. G06Q 30/02 |
| 2006/0069578 A1 | 3/2006 | Borkowski et al. |
| 2006/0080176 A1 | 4/2006 | Sutcliffe |
| 2007/0011061 A1 | 1/2007 | East |
| 2007/0150375 A1 | 6/2007 | Yang |
| 2007/0294129 A1 | 12/2007 | Froseth et al. |
| 2008/0076451 A1 | 3/2008 | Sheha et al. |
| 2008/0104059 A1 | 5/2008 | Segel |
| 2008/0262972 A1 | 10/2008 | Blake |
| 2008/0319864 A1 | 12/2008 | Leet |
| 2009/0048890 A1 | 2/2009 | Burgh |
| 2009/0099972 A1 | 4/2009 | Angert et al. |
| 2009/0106124 A1 | 4/2009 | Yang |
| 2009/0150193 A1 | 6/2009 | Hong |
| 2009/0164897 A1 * | 6/2009 | Amer-Yahia ....... G06F 16/9535 715/703 |
| 2009/0167553 A1 * | 7/2009 | Hong .................... G06Q 10/06 340/4.61 |
| 2009/0204492 A1 | 8/2009 | Scifo et al. |
| 2009/0307096 A1 | 12/2009 | Antonellis |
| 2009/0319166 A1 | 12/2009 | Khosravy et al. |
| 2010/0070376 A1 | 3/2010 | Proud et al. |
| 2010/0250384 A1 | 9/2010 | Bhargava |
| 2010/0268620 A1 | 10/2010 | Angert |
| 2011/0040642 A1 | 2/2011 | O'Dell |
| 2011/0109435 A1 * | 5/2011 | Bickel ................ G01C 21/3679 340/8.1 |
| 2011/0113040 A1 * | 5/2011 | Bickel ................ G06F 16/9537 707/E17.084 |
| 2011/0161137 A1 | 6/2011 | Ubalde et al. |
| 2011/0191194 A1 * | 8/2011 | Lutnick .............. G06Q 30/0641 705/15 |
| 2011/0208617 A1 * | 8/2011 | Weiland ............. G06Q 30/0641 705/27.1 |
| 2011/0218839 A1 | 9/2011 | Shamaiengar |
| 2011/0258011 A1 | 10/2011 | Burns |
| 2011/0282858 A1 * | 11/2011 | Karidi .................... G06F 16/353 707/E17.108 |
| 2012/0239683 A1 * | 9/2012 | Starkman ............ G06F 16/9535 707/769 |
| 2012/0290413 A1 * | 11/2012 | Harman ................ G06Q 30/06 705/15 |
| 2013/0038800 A1 | 2/2013 | Yoo |
| 2013/0103605 A1 | 4/2013 | Villegas |
| 2013/0110582 A1 * | 5/2013 | Starkman ............ G06F 16/335 705/7.29 |
| 2013/0144730 A1 | 6/2013 | Harman |
| 2013/0144764 A1 | 6/2013 | Walling, III |
| 2013/0159331 A1 * | 6/2013 | Zhang ................ G06Q 30/0261 707/758 |
| 2013/0166347 A1 * | 6/2013 | Scotto ................ G06Q 30/0204 705/7.29 |
| 2013/0311311 A1 * | 11/2013 | Chopra .................. G06Q 50/12 705/15 |
| 2013/0325641 A1 * | 12/2013 | Brown .................... G06Q 50/12 705/15 |
| 2014/0025524 A1 | 1/2014 | Sims et al. |
| 2014/0080102 A1 * | 3/2014 | Krishna ................ G09B 19/0092 434/127 |
| 2015/0052098 A1 * | 2/2015 | Kveton .................. G06Q 50/01 706/52 |

FOREIGN PATENT DOCUMENTS

| | | |
|---|---|---|
| EP | 1 081 625 | 7/2001 |
| JP | 62-050919 | 3/1987 |

(56) References Cited

FOREIGN PATENT DOCUMENTS

| | | |
|---|---|---|
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 | 12/1995 |
| WO | WO 97/08635 | 3/1997 |
| WO | WO 98/35311 | 8/1998 |
| WO | WO 99/17236 | 4/1999 |
| WO | WO 2001/071617 | 9/2001 |

OTHER PUBLICATIONS

Len Lewis, Opening the gates, Progressive Grover, Jul. 1998.
Krishna Bharat, Migratory Applications, dated 1995.
Kevin Crowston, Understanding Processes in Organizations, Jul. 1998.
Kato Kiyosh, A Prototype of a User Interface Software for Portable Terminal with a Small Display Screen, Information Processing Society of Japan (IPSJ) the 53rd National Convention, dated Sep. 4, 1996.
Kambe Tomonari, Screen design simulator "U-face", Information Processing Society of Japan (IPSJ) the 39th National convention colleciton of papers 1457-1458, Oct. 16, 1989.
John Soeder, Cyber Solicitation, Restaurant Hopsitality, Sep. 1997.
Jennifer Rowley, Internet food retailing: the UK in context, ProQuest LLC, 1998.
IBM, POS Computer, 1998.
Eshop.com, eShop Technology, eshop.com, Jan. 1, 1996.
Eshop.com, eShip Technology Merchant Manual, eShop.com, Feb. 21, 1996.
A Chavez, A real-life experiment in creating an agent marketplace, PAAM, 1997.
Elite32 Restaurant System, Compuwave Technologies Inc., 2000.
Micro Systems, Inc., Appendix, User's Manual, 8700 HMS Version 2.10, micros Systems, Inc., 1995-1997.
Chuck Andraka, Put your database on the Web, Data Based Advisor, v14, n6, p. 12, Jun. 1996.
Chapter 4—Wireless Data, Wireless Technologies and the National Information Infrastructure, Diane Pub Co, Oct. 1995.
Carrie Lehman, Service connects restaurants, customers via orders by Internet, Alaska Journal of Commerce, Apr. 28, 1997.
Business Editors, Fujitsu and Sulcus Hospitality Group partner to develop first wireless computer for restaurant industry, Business Wire, Aug. 30, 1993.
Brew Moon Management Toasts SQUiRREL's "Seamless Solution", SQUiRREL Systems, Nov. 1998.
Barron Housel, WebExpress: a system for optimizing web browsing in a wireless environment, dated 1996.
Arthur Keller, The DIANA approach to mobile computing, CiteSeer, 1995.
Andrew Fano, Shopper's Eye: Using Lcoation-based filtering for a shopping agent in the physical world, 1998.
Accel Partners Invest $10 Million incybermeals, Business Wire, May 28, 1998, 5 pgs.
About Us, Compuwave Technologies Inc., Feb. 7, 2001.
Engaging Customers Across All Touch Points, dated Jun. 27, 2019, A Roadmap for Leading Retailers, Blue Martini Software, Inc., www.bluemartini.com.
Rita Marie Emmer, Marketing Hotels: Using Global Distribution System, Cornell Hotel and Restaurant Administration Quarterly, 1993, 34; 80, DOI: 10.1177/001088049303400614.

Wireless POS Drive-Through System, Compuwave Technologies Inc., 2000.
T. Imielinski, Adaptive Wireless Information Systems, 1994.
Sulcus's Squirrel and cybermeals Ink Technology Alliance, Business Wire, Feb. 24, 1998.
Steven Vaughan-Nichols, Unleashing Databases on the Web—True wealth and power belong to those who control information access, Netguide, 1996, n307, p. 111.
Squirrel Systems, Squirrel.RTM. Customer Profile: Chevys Fresh MEX.RTM., Squirrel Systems—Restaurant Management, Aug. 1998.
Squirrel Systems, Press Releases, Squirrell Systems, Aug. 20, 1998.
Squirrel Systems, POS System, May 8, 1999, http://web.archive.org/web/19990508175824/www.squirrelsystems.com/product- s/newsq.
Squirrel Systems, May 8, 1999, http://web.archive.org/web/19990508153731/www.squirrelsystems.com/about/c- ompany.
Squirrel point-of-sale software, Squirrel Systems, Oct. 10, 1999.
Robin Berger, POS Positions Spago for Growth, Squirrel Systems, Apr./May 1997.
Micro Systems, Inc., 8700 HMS Product Overview, Micro Systems, Inc., 2000.
RMS Touch, Company Profile RMS, Touch.com, Integrated Restaurant Software, Feb. 15, 1997.
Micro Systems, Inc., All About Us, Micro Systems, Inc., Nov. 11, 1996.
Richard De Santa, Are you into your customers?, Supermarket Business, Jan. 1997.
Rev Share Information, Cybermeals, Jan. 24, 1998.
POS Infrared Restaurant System, Compuwave Technologies Inc. 2000.
P.L. Olympia, Cold Fusion 1.5; Autobahn, DBMS, v9, n8, p. 33, Jul. 1996.
Micros Systems, Inc., POS Configurator User's Guide, 3700 POS, Micros Systems, Inc., 1998.
Micros Systems, Inc., New Products, Micros Systems, Inc., Nov. 11, 1996.
Micro Systems, Inc., Quick Service Operations, Micro Systems, Inc., Nov. 11, 1996.
Micro Systems, Inc., Micros Hand-Held TouchScreen, Micro Systems, Inc., Sep. 1992.
Micro Systems, Inc., Full Service Operations, Micros 3700 Point-of-Sale System, Micro Systems, Inc., Nov. 11, 1996.
Wireless Restaurant System, Compuwave Technologies Inc., Feb. 7, 2001.
RMS Touch, RMS-Touch—Touch Screen Restaurant Management System Product Description, RMSTouch.com, Feb. 15, 1997.
Justin, U.S. Appl. No. 15/719,434, filed Sep. 28, 2017, Notice of Allowance, dated Jan. 9, 2020.
Justin, U.S. Appl. No. 15/719,434, filed Sep. 28, 2017, Interview Summary, dated Dec. 12, 2019.
Justin, U.S. Appl. No. 15/719,434, filed Sep. 28, 2017, Office Action, dated Sep. 6, 2019.
U.S. Appl. No. 14/520,901, filed Oct. 22, 2014, Office Action dated Jun. 1, 2017.
U.S. Appl. No. 14/520,901, filed Oct. 22, 2014, Final Office Action, dated Oct. 21, 2016.
Belousova, U.S. Appl. No. 14/520,901, filed Oct. 22, 2018, Interview Summary, dated Jun. 18, 2018.
Belousova, U.S. Appl. No. 14/520,901, filed Oct. 22, 2014, Office Action, dated Jul. 17, 2015.
Belousova, U.S. Appl. No. 14/520,901, filed Oct. 22, 2014, Office Action, dated Mar. 27, 2018.
Belousova, U.S. Appl. No. 14/520,901, filed Oct. 22, 2014, Notice of Allowance, dated Sep. 14, 2018.
Belousova, U.S. Appl. No. 14/520,901, filed Oct. 22, 2014, Interview Summary, dated Mar. 5, 2018.
Belousova, U.S. Appl. No. 14/520,901, filed Oct. 22, 2014, Final Office Action, dated Dec. 8, 2017.
Belousova, U.S. Appl. No. 14/520,901, filed Oct. 22, 2014, Interview Summary, dated Jun. 26, 2018.

* cited by examiner

1200

Cuisine /1206
- ☐ BBQ
- ☐ American
- ☐ Halal
- ☐ French

Dishes /1208
- ☐ Soup
- ☐ Pizza
- ☐ Taco
- ☐ Salad

Dietary /1210
- ☐ Healthy
- ☐ Gluten free
- ☐ Peanut free
- ☐ Low sodium

Ratings
- ☐ 5 stars
- ☐ 4 stars and up
- ☐ 3 stars and up
- ☐ 2 star and up

↘ 1212

2 Restaurant named Chipotle  /1202

| CHIPOTLE (48th and Main) | | Distance | 0.5 mi |
| Mexican | | Delivery | 15-20 min |
| Rating: 4 stars | | View menu | |
| Most Popular Dishes | | | |
| Chicken Burrito | $7.50 | Beef Burrito | $9.50 |

| CHIPOTLE (96th and Pacific) | | Distance | 0.6 mi |
| Mexican | | Delivery | 15-20 min |
| Rating: 4 stars | | View menu | |
| Most Popular Dishes | | | |
| Crispy Tacos | $7.50 | Bean Burrito | $9.50 |

10 Dishes with Chipotle

| Spicy Chipotle Shrimp | $12.20+ |
| Grilled shrimp,chicken, avocado, naturally smoked bacon, hard-boiled egg, crumbled blue cheese and tomato with romaine lettuce | |
| ORION GRILL | Distance 0.5 mi |
| Salad | Delivery 15-20 min |
| Ratings: 4.5 | |

| Chipotle Dish | $10.00 |
| Grilled chicken, avocado, naturally smoked bacon, hard-boiled egg, crumbled cheese and tomato with romaine lettuce | |
| CHIP T | Distance 0.7 mi |
| Salad | Delivery 15-20 min |
| Ratings: 4.0 | |

[0] Salad
    [1] Chicken Salad
        [2] Grilled Chicken Salad
        [2] Chicken Salad Sandwich
    [1] Caesar Salad
        [2] Chicken Caesar Salad
    [1] Tuna Salad
    [1] Greek Salad
    [1] House Salad
    [1] Garden Salad
    [1] Chef Salad
    [1] Green Salad
    [1] Cobb Salad
    [1] Spinach Salad
    [1] Potato Salad
    [1] Shrimp Salad
    [1] Egg Salad
    [1] Antipasto Salad
    [1] Salad (Lunch Only)
    [1] Chicken Salad Sandwich
    [1] Taco Salad
    [1] Side Salad
    [1] Chopped Salad
[0] Pizza
    [1] Cheese Pizza
    [1] Veggie Pizza
    [1] Pizza and
    [1] Hawaiian Pizza
    [1] White Pizza
    [1] Large Pizza
    [1] BBQ Chicken Pizza
    [1] Pizza Slice
    [1] Pepperoni Pizza
    [1] Buffalo Chicken Pizza
    [1] Margherita Pizza

[0] Sandwich
    [1] Chicken Sandwich
        [2] Grilled Chicken Sandwich
    [1] Cheese Sandwich
        [2] Grilled Cheese Sandwich
    [1] Club Sandwich
    [1] Turkey Sandwich
    [1] Steak Sandwich
    [1] Sandwich with2 Toppings
    [1] Egg Sandwich
    [1] BLT Sandwich
    [1] Sandwich Combo
    [1] Parmigiana Sandwich
    [1] Roast Beef Sandwich
    [1] Chicken Salad Sandwich
    [1] Veggie Sandwich
    [1] Sandwich (Lunch Only)
    [1] Ham Sandwich
[0] Pasta
    [1] Ravioli
        [2] Cheese Ravioli
    [1] Penne
    [1] Lasagna
    [1] Baked Ziti
    [1] Linguine
    [1] Tortellini
    [1] Rigatoni
    [1] Fettuccine Alfredo
[0] Sushi
    [1] Roll
    [1] Nigiri Sushi
    [1] Tuna
    [1] Sashimi
[0] Steak
    [1] Pepper Steak
    [1] Sirloin
    [1] Steak Sandwich
    [1] Filet Mignon

FIG. 20

SYSTEM AND METHOD FOR PROVIDING FOOD TAXONOMY BASED FOOD SEARCH AND RECOMMENDATION

BENEFIT CLAIM

This application claims the benefit under 35 U.S.C. § 120 as a Continuation of application Ser. No. 16/453,889, filed Jun. 26, 2019, which is a Continuation of application Ser. No. 14/520,901, filed Oct. 22, 2014, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present invention relates to a system and method for providing a restaurant service, and more particularly relates to a restaurant service system and method for building a food taxonomy. More particularly still, the present invention relates to a restaurant service system and method for providing improved food search and browsing using a food taxonomy and based on diners' search intent.

DESCRIPTION OF BACKGROUND

A restaurant service usually includes hundreds or thousands participating restaurants. The restaurant service aggregates the participating restaurants' menus, each of which includes a plurality (meaning more than one) of menu items. Each menu item has a title (meaning a name), a description about the menu item and attributes, such as price and type (drink, appetizer, entree, dessert, etc.). The menus and menu items are stored in a database within a restaurant service system that empowers and provides the restaurant service. The restaurant service system also stores additional information about the participating restaurants. For example, the location, cuisine type (such as pizza or Mexican food), service hours, types of services, delivery area, and various service fees of each participating restaurant are stored in the database.

The restaurant service system is usually accessible over the Internet. Diners use computers (such as desktop computers, laptop computers, tablet computers, smartphones, or personal digital assistant ("PDAs")) to access web pages provided by the restaurant service system. The web pages allow the diners to search and find desired restaurants and menu items for the purpose of building and placing food orders. The restaurant service system then sends the orders to the respective serving restaurants for the orders.

To search for a desired restaurant to place a food order, a diner enters his search criteria (also referred to herein as search terms and search data), such as his address, a restaurant name, or a menu item. For example, the diner keys in his street address, city, state and desired food type. The search data is then sent to a server within the restaurant service system. The server accesses the database and retrieves a list (meaning zero or more) of restaurants meeting the search criteria. For example, each restaurant in the list is within a predefined radius from the address he entered, and serves the type of food matching the entered cuisine type.

The diner then chooses a restaurant, and builds an order with selected menu items of the selected restaurant. Once the food order is built and placed, the restaurant service system receives the order, stores the order into the database, and forwards the order the selected restaurant (meaning the serving restaurant for the placed order). The serving restaurant prepares the order before the order is delivered to the diner by a delivery service. The delivery service carries the prepared food order from the restaurant to the addresses of the diner.

Conventional restaurant services present numerous shortcomings in meeting diners' needs. A conventional restaurant service maintains a collection menus and menu items. Two menu items from two different restaurants may indicate the same dish (such as Chicken Pad Thai), but have different menu item titles. The different menu names cause the conventional restaurant service to treat the two menu items as two unrelated menu items, and thus provide inferior food search results. In addition, the conventional restaurant service fails to understand and take advantage of important information provided by diners' search terms. For example, diners often enter dish attributes (such as healthy, vegan, and Halal) indicating their food search intent. Failure of understanding the dish attributes and diners' intent produces undesirable food search results and food recommendation. The problem is further compounded by hyper-locality or restaurant data making relevant recommendations very difficult due to data scarcity. In other words it is very difficult to find similar users, dishes, or restaurants since every menu item is unique. Accordingly, there is a need for an improved restaurant service that incorporates a food taxonomy including dishes, dish attributes and dish ingredients. The improved restaurant service uses the food taxonomy to provide superior food search results and recommendation, and rich navigation and discovery capabilities. In addition, the improved restaurant service determines the food search intent of diners and provided more related search results and food recommendations matching their food search intent.

OBJECTS OF THE DISCLOSED SYSTEM, METHOD, AND APPARATUS

Accordingly, it is an object of this disclosure to provide a restaurant service system and method that builds a food taxonomy.

Another object of this disclosure is to provide a restaurant service system and method for mapping menu items to dishes in a food taxonomy.

Another object of this disclosure is to provide a restaurant service system and method for mapping menu items to dishes in a food taxonomy based on the frequency menu items appear in restaurant menus.

Another object of this disclosure is to provide a restaurant service system and method for mapping menu items to dishes in a food taxonomy based on the frequency menu items appear in restaurant menus, search logs and order history.

Another object of this disclosure is to provide a restaurant service system and method for mapping menu items to dishes in a food taxonomy using a dish classifier.

Another object of this disclosure is to provide a food taxonomy of dishes with dish attributes.

Another object of this disclosure is to provide a food taxonomy of dishes with dish ingredients.

Another object of this disclosure is to provide a food taxonomy of dishes with a dish popularity rank.

Another object of this disclosure is to derive dish attributes from search logs.

Another object of this disclosure is to provide a food taxonomy based restaurant service system and method that identify the search intent of diners.

Another object of this disclosure is to provide improved food search based on the search intent of diners.

Another object of this disclosure is to provide improved food search based on similarity between restaurants.

Another object of this disclosure is to provide improved food search and recommendation based on taste similarity between diners.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a system and method for providing a restaurant service to diners. In accordance with the present teachings, the system includes restaurant server adapted to communicate with diner communication devices over a wide area network. The diner communication devices are used by diners for accessing the restaurant service. The server is also adapted to communicate with restaurant communication devices operated by restaurants. The server receives menus and menu items from the restaurant communication devices, saves the menus and menu items into a database, and maps the menu items to dishes in a taxonomy. The menu item dish mappings are stored in the database as well. To map a menu item to a dish, the server determines a menu item frequency, a search log frequency, and a food order frequency. From the menu item frequency, a search log frequency, and a food order frequency, the server derives a menu rank, a search rank and a food order rank respectively.

The server then derives an accumulative rank from the menu rank, the search rank and the food order rank. If the accumulative rank is over a predetermined threshold, a dish is created from the menu item. In other words, the menu item is mapped to a new dish. The accumulative rank is considered as a dish popularity for the dish. The server also trains dish classifiers for dishes. For each dish, the server trains a dish classifier from menu items mapped to the dish and menu items that are mapped to different dishes. The dish classifier is then applied to new menu items and other unmapped menu items to determine whether these menu items should be mapped to the dish.

Search terms are used by the server to derive dish attributes. The server also derives dish ingredients from menu item description and other information. Dishes, dish attributes and dish ingredients are ranked based on how often they appear in search logs and indexed and searched when diners search for food. The server determines the search intent of the diners by parsing and analyzing the search terms and enriching the query with additional attributes and engine hints. The search intent is then used to provide improved food search. Also considered in food search is restaurant similarity. Dishes from similar restaurants are ranked higher in a search result list. The search result list can be browsed and sorted by facets and filters, such as dish popularity and dish attributes. In addition, the server determines taste similarity between diners. The taste similarity is used to provide dish recommendations to diners. Certain dishes are frequently ordered together. For example, French Fries are often ordered together with hamburgers. Accordingly, when a hamburger is ordered, French Fries are recommended to the diner ordering the hamburger.

Dishes are arranged in hierarchical structure with dishes being nodes at different levels within the hierarchical structure. Each node include properties, such as dish attributes and dish ingredients. In addition to the dish hierarchy, the food taxonomy also includes additional hierarchies, such as a hierarchy for ingredients and another hierarchy for food preparation method. The node properties are presented to diners as facets. Each facet is a food search and browsing refinement option. The facets are also tracked and periodically ranked by the restaurant server.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 12 is a sample screenshot of a diner device displaying a food search result list in accordance with the teachings of this disclosure;

FIG. 20 is an illustrative directed graph in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
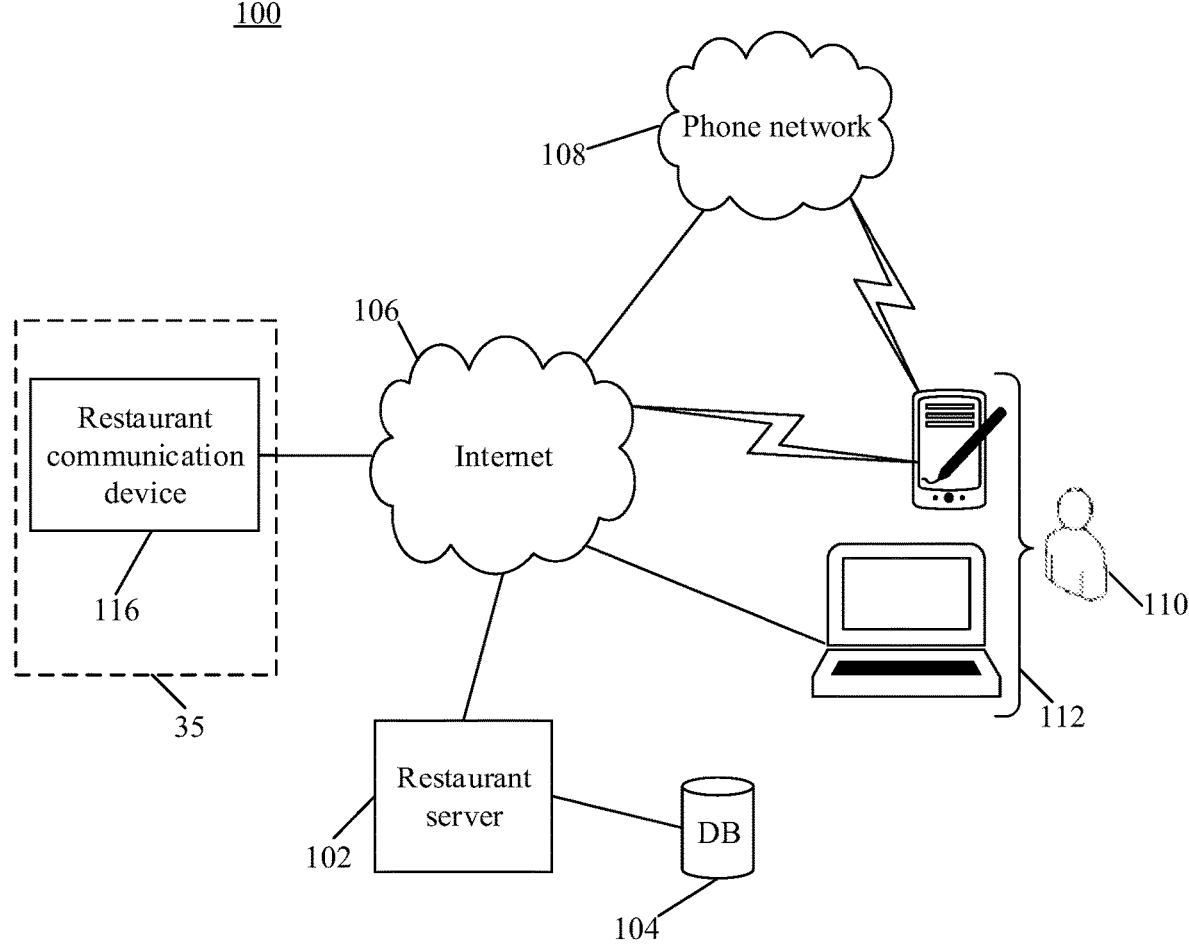
FIG. 1 is a simplified block diagram of a restaurant service system in accordance with this disclosure.

Turning to the Figures and to FIG. 1 in particular, a restaurant service system serving diners is shown and generally indicated at 100. The illustrative system 100 provides for real-time or near real-time information exchange between participating restaurants, the system 100, diners, and food deliverymen. The system 100 includes a restaurant server 102, a database 104 operatively coupled to the restaurant server 102, a restaurant communication device 116 communicating with the restaurant server 102 over a wide area network 106 (such as the Internet), and a diner communication device 112 used by a diner 110 for accessing and communicating with the restaurant server 102.

Figure 16:
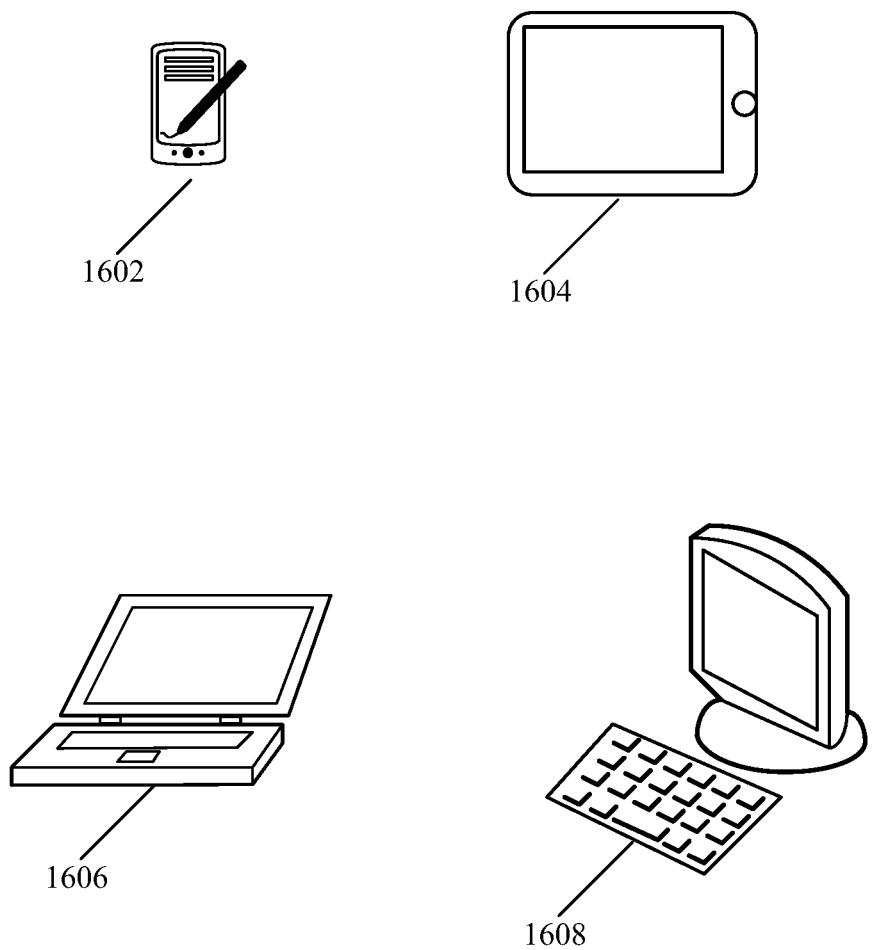
FIG. 16 is a perspective view of diner communication devices in accordance with the teachings of this disclosure.

The diner communication device (also referred to herein as diner device) 112 can be a desktop computer, a laptop computer, a tablet computer or a smartphone as pictured in FIG. 16. For example, a laptop computer 112 communicates with the restaurant server 102 over the Internet 106 through a local WiFi link or an Ethernet cable link. As an additional example, a smartphone 112 communicates with the restaurant server 102 over the Internet 106 through a local WiFi link or a link to a public cellular phone network 108. The diner device 112 can also be other types of communication devices, such as a PDA, that is capable of network communication and visual display.

The diner device 112 runs a diner software application, such as a web browser provided by Google or Microsoft, for interacting with the diner 110 and communicating with the restaurant server 102. The diner software application can also be a proprietary software application. The diner software application allows the diner 110 to search for restaurants and dishes, place a food order including one or more menu items, and send and receive messages.

Figure 17:
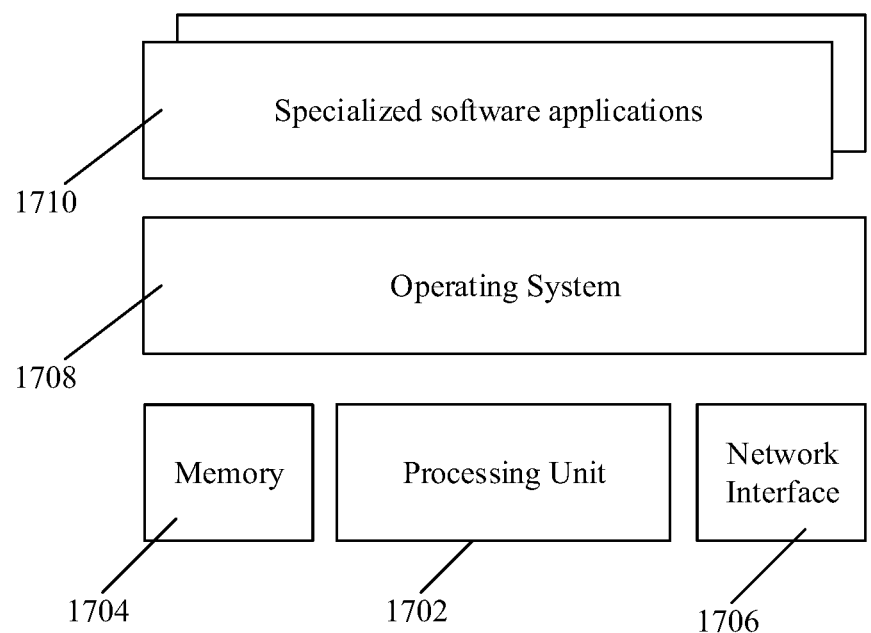
FIG. 17 is a simplified block diagram of a server performing specialized functions in accordance with the teachings of this disclosure.

The restaurant server 102 is further illustrated by reference to FIG. 17. Referring now to FIG. 17, a simplified block diagram of the restaurant server 102 is shown. The server 102 has one or more processors (such as central processing units) 1702, one or more networking interfaces 1706 coupled to the processor 1702 and the Internet 106, some amount of memory 1704 accessed by the processor 1702. The networking interface 1706 (or a different networking interface) is also used to access the database 104. The restaurant server 102 is said to be operatively coupled to the Internet 106 and the database 104. The restaurant server 102 can be a standalone or distributed server system including more than one server that are distributed in multiple physical locations. The restaurant server 102 can also be implemented as a cloud server system.

In the illustrative embodiment, the restaurant server 102 runs an operating system 1708, such as Linux or Windows. The restaurant server 102 includes one or more specialized server software applications 1710 running on the operating system 1708 and the processor 1702. The server software application 1710 actuates the server 102 to perform the inventive steps of the instant disclosure. The server software application 1710 is written in one or more computer programming languages, such as Java, C#, PHP, Object-C, etc. When the server software application is run on the server 102, the server 102 is coded, controlled and actuated to carry out specialized functions of the present invention. In such a case, the server software application is part of the server 102. By performing the specialized functions defined by the server software application, the restaurant server 102 becomes a specialized machine.

The server software application can be implemented with different layers, such as a user interface layer, a business logic layer and a data layer. One main function of the user interface layer is to interact with users, such as the diner 110. The user interface layer generates user interface, such as web pages coded in HTML and JavaScript languages, and retrieves user input data entered by the diner 110. Logically sitting the user interface layer, the business logic layer implements business policies and decisions. The data layer handles data between the business logic layer and the database 104.

Turning back to FIG. 1, the database 104 can be a standalone or distributed database system, such as a database farm distributed across multiple physical locations. A distributed database system provides the benefit of scalability, reliability, availability, data replication, etc. In one implementation, the database 104 is a relational database, such as Oracle or Microsoft SQL databases. Alternatively, the database 104 is a cloud based database, such as Cassandra or Google BigTable.

The restaurant communication device (also referred to herein as restaurant device) 116 can be any one of the devices pictured in FIG. 16 or a different device, such as an embedded system. The restaurant device 116 is operated and used by a restaurant 35 for communicating with the restaurant server 102. For example, the device 116 is used to upload restaurant menus, each of which includes a list of menu items. As an additional example, the device 116 receives orders from the restaurant server 102, and provides order status updates to the restaurant server 102.

A food taxonomy of a restaurant service includes a hierarchical graph of dishes, and associated dish attributes and dish ingredients for each dish in the food taxonomy. The hierarchical graph is a directed graph with dishes as its nodes and the dish attributes and dish ingredients as properties of the nodes. In the directed graph, dishes are arranged and placed at different levels. Except nodes at the root level, each node has one or more parent nodes. Nodes at the root level (meaning the highest level and level one) are also referred to herein as root nodes. Each root node has one or more child nodes. Each node is a child node of one or more parent nodes at a higher level. In other words, each node at level N (meaning an integer larger than one) is a child node of one or more parent nodes at level N−1. For example, steak salad and chicken salad dishes are child nodes a of a salad dish node.

An illustrative directed graph is further illustrated by reference to FIG. 20. Turning to FIG. 20, an illustrative directed graph 2000 is shown. In the directed graph, root level nodes are indicated as level 0 nodes, such as the node 2002. The node 2002 has a list of level 1 nodes, such as the node 2004 and 2008. The node 2004 includes a list of level 2 nodes, such as the node 2006. The dish "Chicken Salad Sandwich" a child node of the level 1 node 2004 and a child node of the level 0 node 2002.

The nodes and the nodes properties are stored in the database 104. In one implementation, the dishes, dish attributes and dish ingredients are indexed in the database 104 for fast searching. One or more node properties is presented to diners as a facet. Each dish can also be presented to diners as a facet. Facets allow diners to browse available dishes and refine a set of search results.

A dish is a food item that has the same or different menu item titles in different menus. For example, a hamburger or cheese burger is dish that likely has the same name in different restaurants' menus. However, many dishes appear in different menu item titles on different menus. For instance, "Chicken Pad Thai" and "Pad Thai with Chicken" are two different menu item titles in two different menus of two different restaurants, while they represent the same dish—Chicken Pad Thai.

Figure 15:
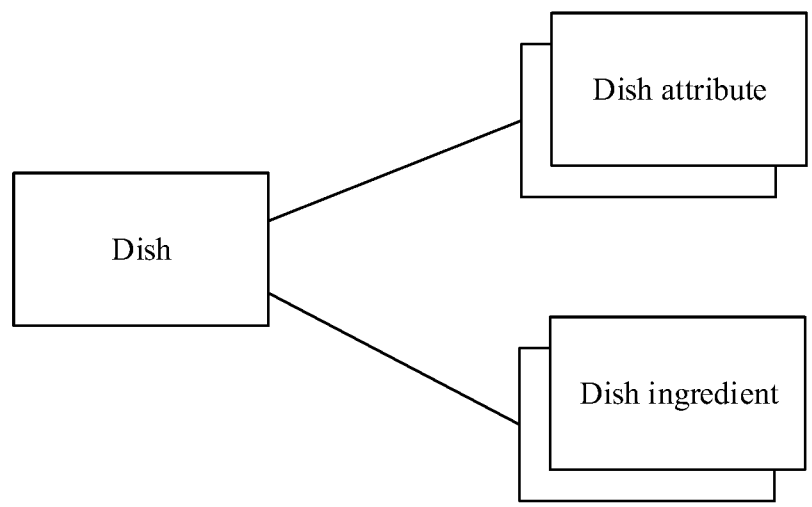
FIG. 15 is an entity relationship diagram showing a dish and its dish attributes and dish ingredients in accordance with the teachings of this disclosure.

Dish attributes describe the characteristics of a dish. "Healthy," "vegan," "Halal," "Gluten free," "Low sodium" and "Peanut free" are illustrative dish attributes. As an additional example, the preparation method of a dish is a dish attribute of the dish as well. As still a further example, ratings of dishes can be used as dish attributes as well. Dish ingredients are ingredients comprising a dish. For example, a Chicken Pad Thai includes chicken, noodle, egg, bean sprouts and tofu as its main ingredients. A dish and its attributes and ingredients are further illustrated in an entity relationship diagram in FIG. 15. Dishes, dish attributes and dish ingredients along with restaurants, menus, menu items and diners are represented by data tables and records in the database 104.

Figure 2:
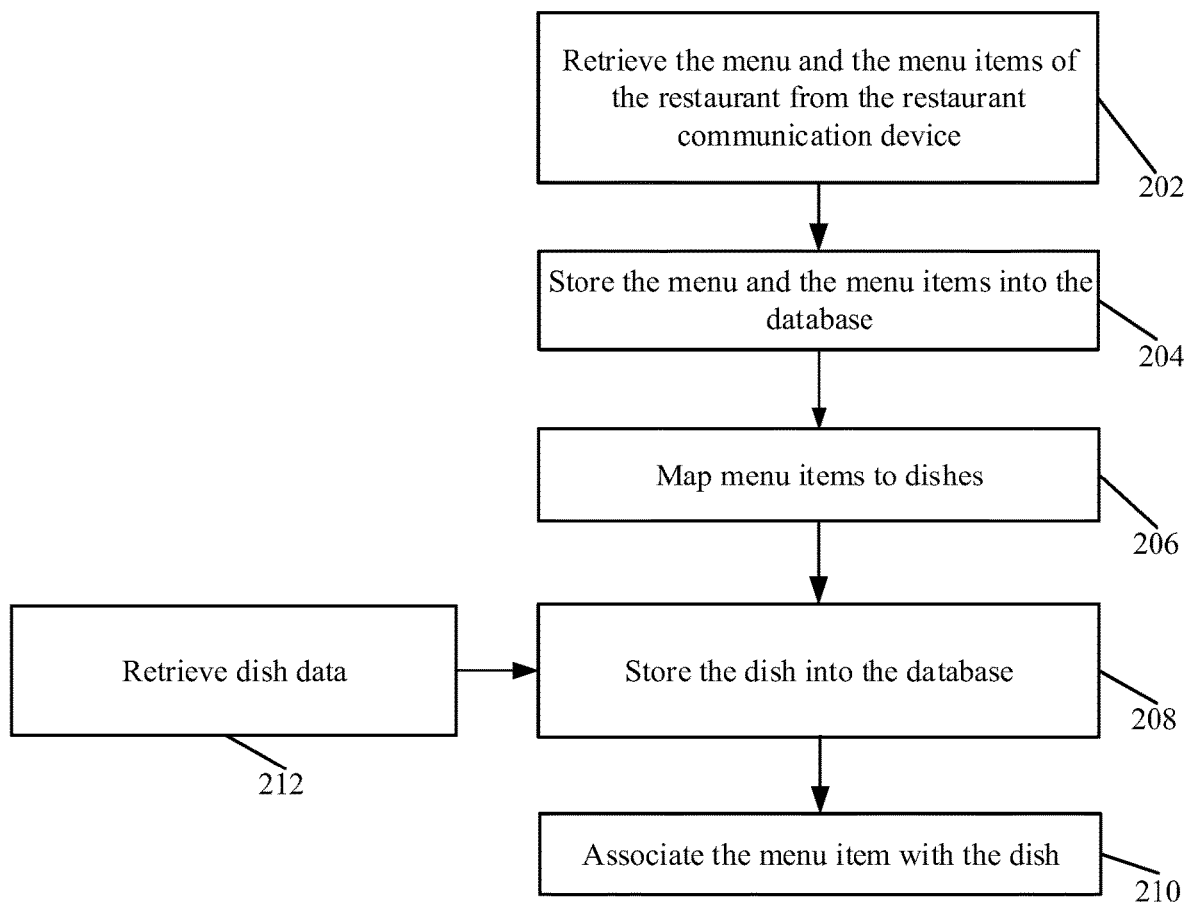
FIG. 2 is a flowchart that depicts a process by which a restaurant service server generates a food taxonomy in accordance with the teachings of this disclosure.

A food taxonomy is built, updated and maintained by the server software application as shown in FIG. 2. Referring to FIG. 2, a flowchart depicting a process by which the restaurant server 102 builds and updates the food taxonomy, is shown and generally indicated at 200. The food taxonomy data is stored in the database 104. At 202, the server software application retrieves the menu and the menu items of the restaurant 35 (or any other restaurant participating in the restaurant service) from the device 116. In one implementation, the server software application provides a web page interface allowing staff members of the restaurant 35 to enter and modify the menu and the menu items using the restaurant device 116. In a different implementation, the server software application communicates with a proprietary software application running on the device 116 to retrieve such information. It should be noted that the menu items can be new or modified menu items from the restaurant 35. Each menu includes a collection of menu items, each of which includes a title, a description, a price, one or more menu attributes (such as type), one or more notes (indicating, for example, availability of the menu item), and other information.

At 204, the server software application saves the menu and the menu items into the database 104. Inside the database 104, the menu is associated with the restaurant 35, and each menu item is associated with the menu. In a further implementation, each menu item is also associated with the restaurant 35. At 206, the server software application maps some or all (meaning a subset) menu items to dishes. Each dish that is mapped to from a menu item can be a new or existing dish in the taxonomy. Where the dish is a new, at 208, it is stored into the database 104. At 210, the server software application associates the menu item with the dish by, for example, updating the database 104 to create a menu item dish mapping between the menu item record and the dish record inside the database 104.

Dishes can also be created by a partially manual process. For example, the server software application provides an interface (such as a web page) allowing a staff member to create and/or modify one or more dishes. For example, on the web page, the staff member enters or modifies a dish title, one or more dish attributes, one or more dish ingredients, and a dish description. In such a case, at 212, the server software application retrieves the dish data entered on a computing device, and creates the one or more dishes. At 208, the server software application stores the one or more dishes, and the corresponding(s) mappings into the database 104.

The interface provided by the server software application further allows the staff member to define and/or revise a list of groups of synonyms. For example, a group of synonyms includes the words "pollo" and "chicken," which are interpreted to stand for the same dish ingredient. Moreover, the interface allows the staff member to define and/or revise a stop word list for parsing menu items, search logs, etc. For example, "Coke" and "2 L Coke" are regarded as the same dish. In such a case, the word "2 L" is added into the stop word list. In other words, "2 L" is a stop word that is filtered out by the server software application. In one implementation, the list of groups of synonyms and the stop word list are used by the server software application to process and filter menu item titles in mapping menu items to dishes, menu item descriptions in deriving dish attributes and ingredients, and/or search terms in searching for food.

Figure 3:
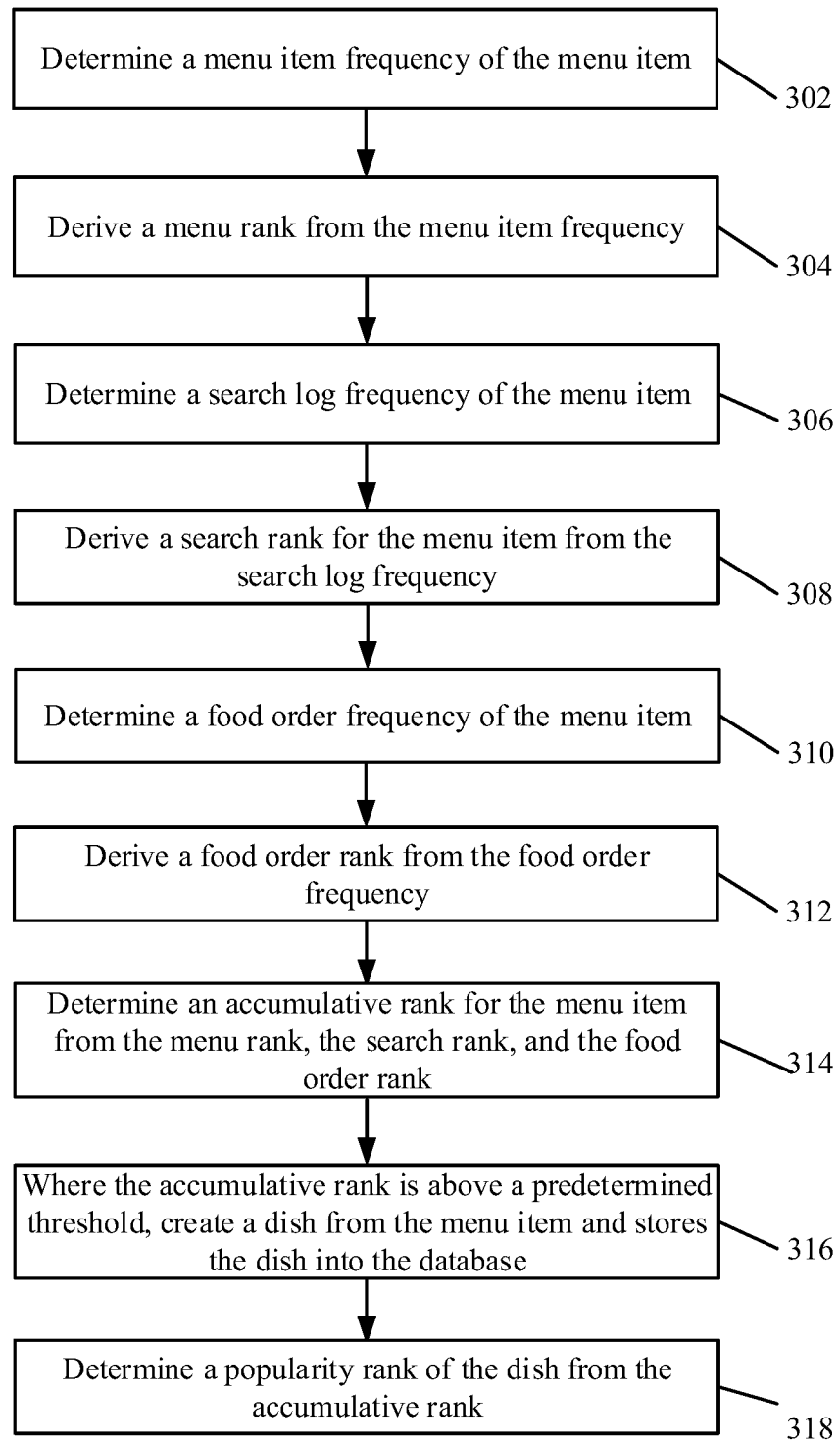
FIG. 3 is a flowchart depicting a process by which a restaurant server maps a menu item to a dish in a food taxonomy in accordance with the teachings of this disclosure.

The server software application performs one or more processes to map menu items to dishes. These processes are further illustrated by reference to FIGS. 3, 4, 5 and 6. Referring first to FIG. 3, a flowchart depicting a process by which the server software application maps a menu item to a dish is shown and generally indicated at 300. At 302, the server software application determines a menu item frequency, meaning the number of restaurant menus that include the menu item, for the menu item. The menu item frequency can be determined using different techniques known in the art. For example, a SQL statement can be built and executed against restaurant menus and menu items stored in the database 104.

As an additional example, the menus and menu items are retrieved from the database 104 and the menu item is then compared by title with each retrieved menu and menu item to determine the menu item frequency. In a further implementation, only menu items of same or similar cuisine type are retrieved from the database 104. At 304, the server software application derives a menu rank from the menu item frequency. For example, the menu rank of the menu item is the integral part of the square root of the menu item frequency. In a further implementation, the menu rank is normalized such that its value is always in the range between, for example, zero and one hundred.

At 306, the server software application determines a search log frequency of the menu item. The search log frequency is, for example, the number of times the menu time appears in search logs from beginning of time, or a predetermined time (such as three hundred days before from the current time). A search log is a record in the database 104 storing the search terms that a diner enters when she/he searches for restaurants and dishes using the system 100. At 308, the server software application derives a search rank for the menu item from the search log frequency. For example, the search rank of the menu item is the integral part of the square root of the search log frequency. In a further implementation, the search rank is normalized such that its value is always in the range between, for example, zero and one hundred.

At 310, the server software application determines a food order frequency of the menu item. The food order frequency is, for example, the number of times the menu time appears in food orders from beginning of time, or a predetermined time (such as three hundred days before from the current time). A food order is an order placed by a diner with one or more menu items, and stored in the database 104. At 312, the server software application derives a food order rank for the menu item from the food order frequency. For example, the food order rank of the menu item is the integral part of the square root of the food order frequency. In a further implementation, the food order rank is normalized such that its value is always in the range between, for example, zero and one hundred.

At 314, the server software application determines an accumulative rank for the menu item from the menu rank, the search rank and the food order rank. The accumulative rank is, for example, a weighted average of the menu, search and food order ranks. Where a weight has the value of zero, the corresponding rank is not considered in determining the accumulative rank. As an additional example, the accumulative rank is a product of the menu, search and food order ranks by multiplication. To determine the accumulative rank, the server software application may optionally select only some, not all, of the menu, search and food order ranks. At 314, if the accumulative rank is above a predetermined threshold (such as a numeric value of seventy), the server software application views the menu item as a dish, creates the dish, and stores the dish in the database 104. The created dish and the menu item have the same name (meaning title). As described later in the disclosure, dish ingredients and dish attributes are also associated with the dish. In addition, at 316, the server software application derives a popularity rank of the dish from the accumulative rank, and saves it in the database 104. In one implementation, the popularity rank of the dish is same as the accumulative rank.

Figure 4:
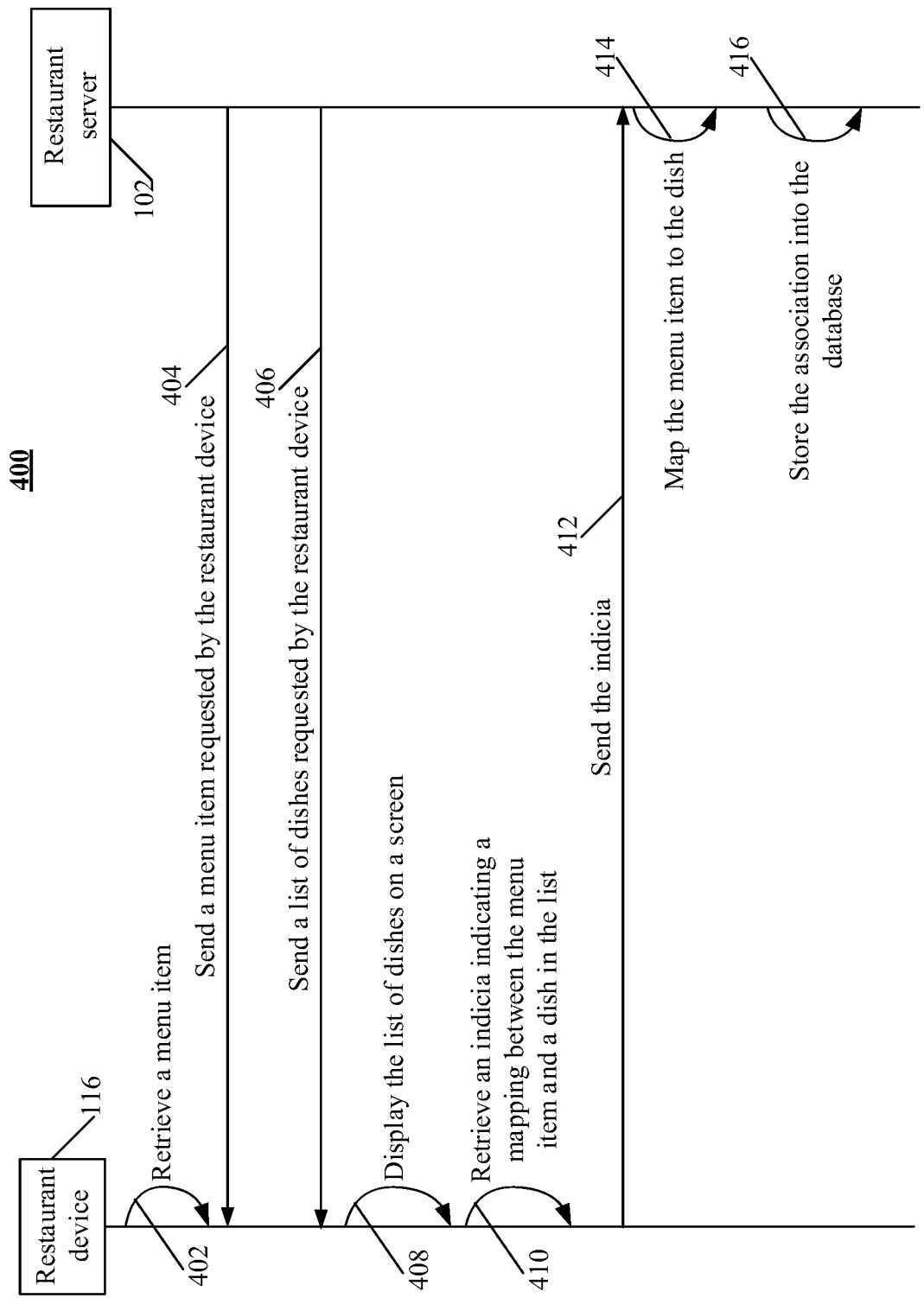
FIG. 4 is a sequence diagram depicting a process by which a restaurant service system maps a menu item to an existing dish in a taxonomy in accordance with the teachings of this disclosure.

Referring to FIG. 4, a sequence diagram depicting a different process by which the system 100 maps a menu item to an existing dish in the taxonomy. At 402, a restaurant software application running on the restaurant device 116 retrieves a menu item entered by a staff member of the restaurant 35 using, for example, a web page provided by the server 102 or an interface provided by the restaurant software application. Alternatively, the menu item already exists in the database 104. In such a case, at 404, the restaurant software application retrieves the menu item from the server 102. The restaurant software application first sends a request after a successful login, such as a web HTTP request, to the server 102. In response, the server software application retrieves the menu item and sends it back to the device 116. For instance, the request is for some or all menu items of the restaurant 35.

In addition, at 406, a list of dishes of the taxonomy is retrieved from the database 104 and sent to the device 116. At 408, the restaurant software application displays the list of dishes on a screen of the device 116 to allow the staff member to select a dish for the menu item. At 410, the restaurant software application retrieves the indicia indicating the mapping between the menu item and the selected dish. At 412, the restaurant software application sends the indicia to the server 102. At 414, the server software application maps the menu item to the dish. Where the menu item is a new menu item, at 414, the server software application stores it into the database 104. At 416, the server software application stores the association (also referred to herein as a mapping) between the menu item and the dish into the database 104. Moreover, at 416, the mapping is indexed in the database 104 for better search performance.

Figure 5:
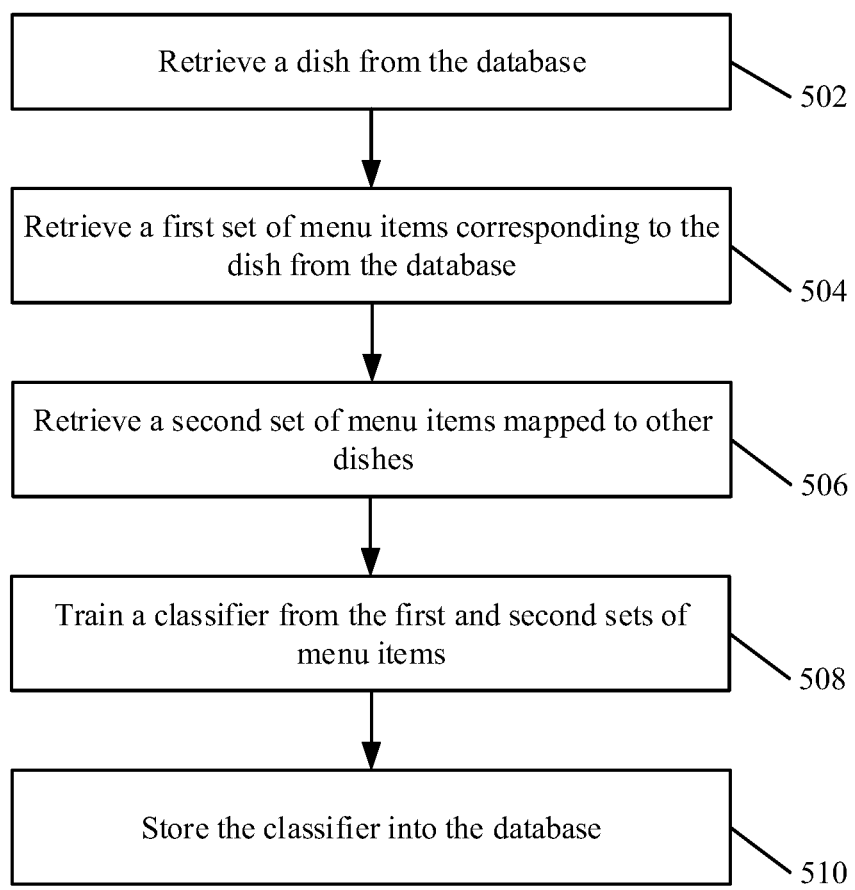
FIG. 5 is a flowchart depicting a process by which a restaurant server trains a dish classifier for a dish in accordance with the teachings of this disclosure.
Figure 6:
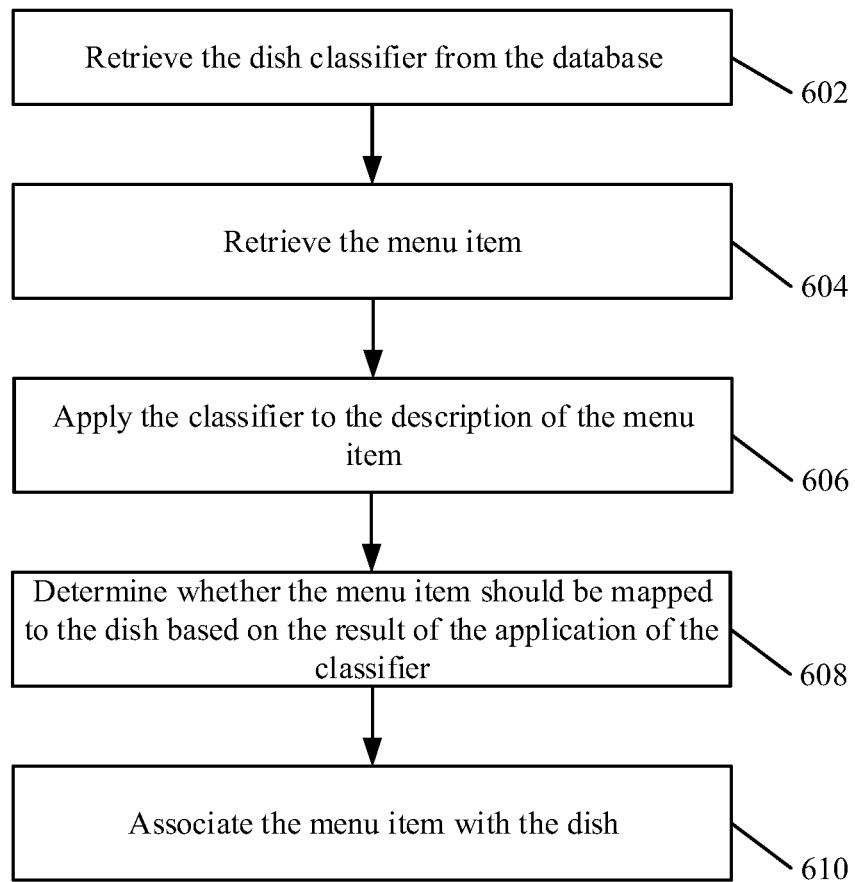
FIG. 6 is a flowchart depicting a process by which a restaurant server applies maps a menu item to a dish by applying a dish classifier to the description of the menu item in accordance with the teachings of this disclosure.

For each dish in the taxonomy, a machine learning based classifier can be trained from the menu items mapped to the dish. The trained classifier is then applied to new menu items and unmapped menu items to determine whether they should be mapped to the dish. As more menu items become available, the classifier can then be refined by running the dish classifier training process again. The training and application of a dish classifier are further illustrated by reference to FIGS. 5 and 6. Turning now to FIG. 5, a flowchart depicting a process by which the server software application trains a classifier for a particular dish is shown and generally indicated at 500. At 502, the server software application retrieves the dish from the database 104. At 504, for the retrieved dish, the server software application retrieves a first set (meaning one or more) of menu items mapped to the dish from the database 104. At 506, for the retrieved dish, the server software application retrieves a second set of menu items from the database 104 that are mapped to different dishes. The second set of menu items can be all or some menu items that are mapped to different dishes.

At 508, the server software application trains a classifier, such as a Naïve Bayes classifier, from the descriptions, price, type, ingredients and/or attributes of the menu items in the first set and the second set of menu items. It should be noted that the classifier can be trained from additional information (such as preparation methods) about the menu items. In one implementation, the name of each menu item is added to the menu item's description for the training. The dish classifier is represented by a set of likelihood functions. At 510, the classifier is stored into the database 104. In the database 104, the type, descriptors, coefficients, and other information of the classifier are recorded.

The trained dish classifier is then applied to a different menu item (such as a new menu item or an unmapped menu item) to determine whether the different menu item should be mapped to the dish. This trained classifier and other dish classifiers are applied to each menu items of a restaurant, which starts to participate in the restaurant service, to map all menu items to known dishes. This application process is further illustrated by reference to FIG. 6, wherein a flowchart depicting a process 600 by which the server software application applies the dish classifier to the description of a menu item (such as a new or unmapped menu item) is shown. In one implementation, the process of mapping menu items to dishes is run as a background process on all menu items or a subset of all the menu items. In addition, this process is executed in a parallel manner to optimize the throughput. In other words, the process is parallelized for a shorter execution cycle.

At 602, the server software application retrieves the dish classifier from, for example, the database 104. At 604, the server software application retrieves the menu item along with its description from, for example, the database 104. At 606, the server software application applies the classifier on the description of the second menu item. In a further implementation, the title of the menu item is added to the description before the dish classifier is run. At 608, based on the result of the classifier, the server software application determines whether the menu item represents the dish. In other words, the server software application determines whether the menu item means the dish. If so, at 610, the server software application associates the second menu item with the dish and stores the association (means a mapping) into the database 104. In such a case, the second menu item is said to be mapped and correspond to the dish and the association is a mapping. The mappings are also indexed for better search performance.

Figure 7:
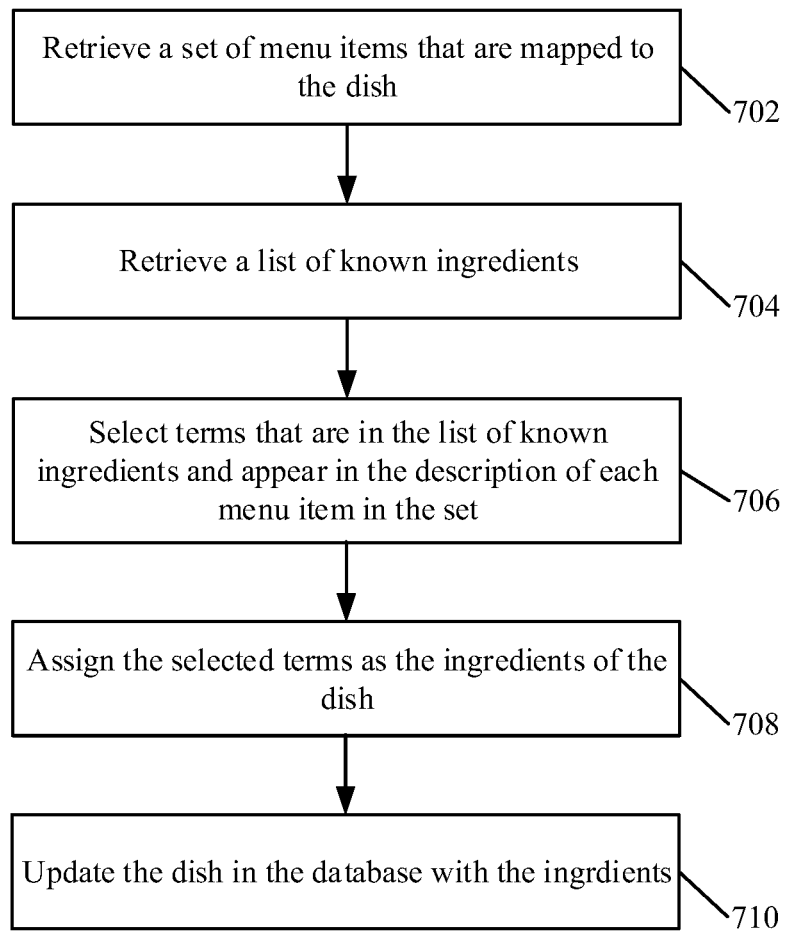
FIG. 7 is a flowchart depicting a process by which a restaurant server determines the dish ingredients of a dish in accordance with the teachings of this disclosure.

After a dish is added into a taxonomy, the server software application determines the dish attributes and dish ingredients for the dish. A process 700 by which the server software application determines the dish ingredients of the dish is illustrated by a flowchart shown in FIG. 7. Referring now to FIG. 7, at 702, the server software application retrieves a set of menu items mapped to the dish from, for example, the database 104. The set of menu items could also be stored in memory of the server 102. At 704, the server software application retrieves a set of known ingredients, such as chicken breast, chicken leg, chicken wing, chicken, green onion, onion, basil, etc., from the database 104 or a different source.

At 706, the server software application selects terms that are in the list of known ingredients and also appear in the description of each menu item in the set of menu items. At 708, the server software application assigns the selected terms as ingredients of the dish. At 710, the server software application updates the database 104 to reflect the dish ingredients of the dish. The process 700 can also be executed to extract preparation methods of dishes. Preparation methods are attributes of dishes. In other words, the process 700, or modified process thereof, are used to extract dish attributes, such as preparation methods.

Figure 8:
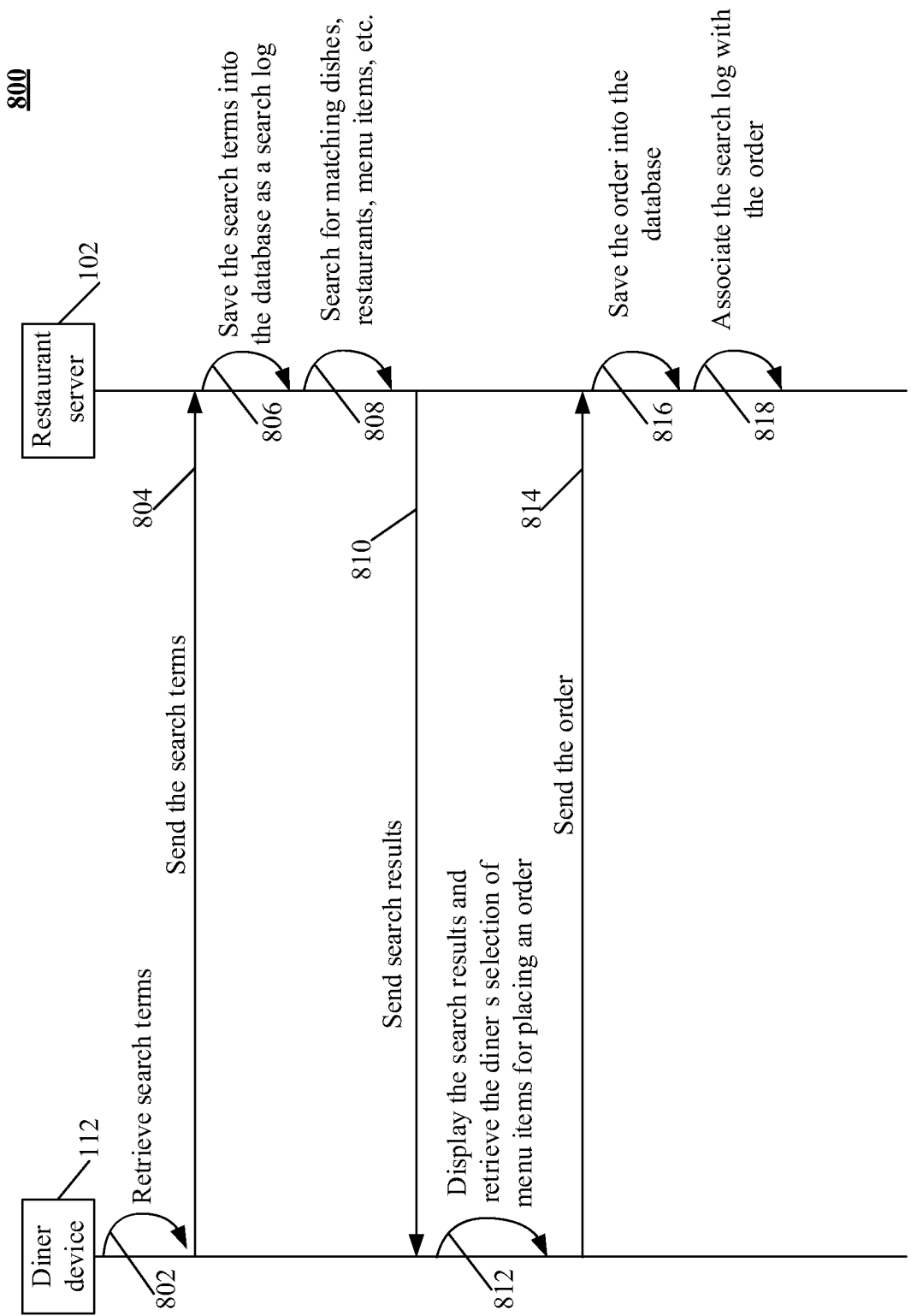
FIG. 8 is a sequence diagram depicting a process by which a restaurant service system implements food search and food ordering in accordance with the teachings of this disclosure.

One source of dish attributes is the search logs, each of which is the search data entered by a diner in a single food search. The search log processing and dish attribute determination are further illustrated by reference to FIGS. 8 and 9. Referring first to FIG. 8, a sequence diagram depicting a process 800 by which the system 100 implements food search and food ordering is shown. At 802, a diner software application running on the diner device 112 retrieves a set of search terms entered by the diner 110. For example, the diner 110 enters the search terms for restaurant and food in a web page provided by the restaurant server 102. At 804, the diner software application sends the search terms to the restaurant server 102. At 806, the server software application stores the search terms into the database 104 as a search log. At 808, the server software application searches for restaurants and dishes matching the search terms by, for example, querying the database 104. A list of search results is then generated. At 810, the server software application sends the list of search results to the diner device 112. At 812, the diner software application displays the search results on the diner device 112. The diner 110 then selects desired menu items for her food order. Accordingly, at 812, the diner software application further retrieves the diner's selection of menu items for placing a food order. At 814, the diner software application sends the order to the server 102. At 816, the server software application saves the order into the database 104, and dispatches the order to the serving restaurant 35 by sending the order to the restaurant device 116. At 818, the server software application associates the search log with the order, and saves the association into the database 104.

Figure 9:
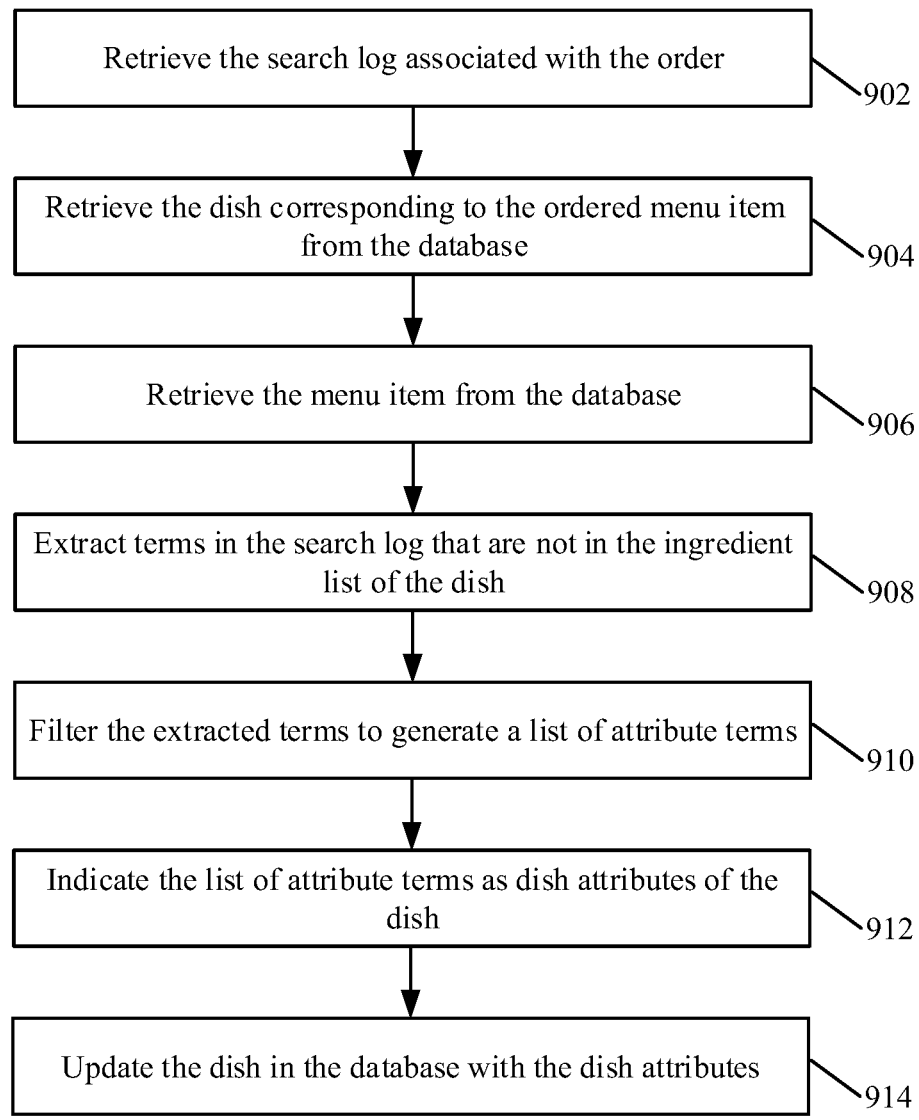
FIG. 9 is a flowchart depicting a process by which a restaurant server determines the dish attributes of a dish in accordance with the teachings of this disclosure.

For each menu item in the placed order, the server software application then performs a process 900 shown in FIG. 9 to determine the dish attributes of the dish corresponding to the ordered menu item. Referring to FIG. 9, at 902, the server software application retrieves the search log associated with the order from the database 104. At 904, the server software application retrieves the dish corresponding to the ordered menu item from the database 104. At 906, the server software application retrieves the menu item from the database 104. At 908, the server software application determines terms, such as healthy and vegan, that are in the search log, not in the list of ingredients of the dish, and not the name of the restaurant serving the order.

At 910, the server software application filters the extracted terms to generate a list of attribute terms. For example, terms in a search log may include words like "where," "the" and "is" that are not dish attributes. Such words are filtered out. The left terms are regarded as attribute terms. At 912, the server software application indicates the list of attribute terms as the dish attributes of the dish. In one implementation, the list of attribute terms are added to existing dish attributes of the dish. Each attribute in the list is ranked higher if it is also an existing dish attribute of the dish. At 914, the server software application updates the dish in the database 104 with the dish attributes.

Figure 10:
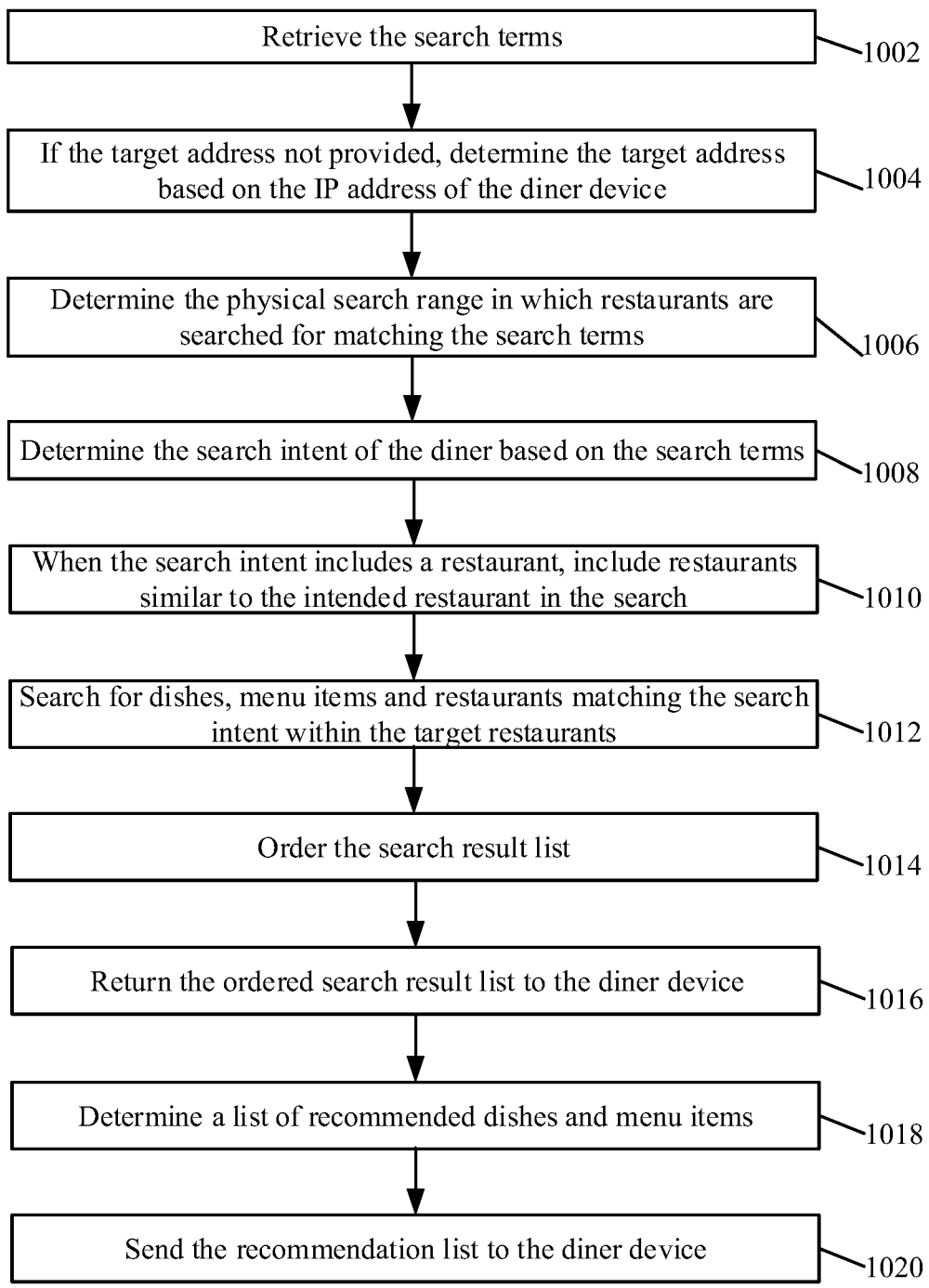
FIG. 10 is a flowchart depicting a process by which a restaurant service system provides food searching to a diner in accordance with the teachings of this disclosure.

The food taxonomy of the restaurant service allows for high quality food recommendations to diners, rich navigation of dishes, and food discovery capabilities. In one implementation, the dishes, the dish attributes and the dish ingredients of the food taxonomy are indexed in the database 104 for faster and higher quality of food search and rich navigation. A higher quality food search returns more relevant search results matching a diner's search intent. Food search, such as the element 808 of process 800, is further illustrated by reference to FIGS. 10, 11 and 12. Referring now to FIG. 10, at 1002, if the search terms are not present in memory of the server 102, the server software application retrieves the search terms from, for example, the diner device 112 or the database 104. The search terms are associated with and part of a food search request. For example, the diner 110 enters the search terms on a food search web page provided by the server 102. The search request is sent when the diner 110 clicks a "Search" button within the page.

At 1004, the server software application determines the target search address of the food search request, which can be entered in the search web page when the diner 110 enters the search terms. For example, the diner 110 enters his street number, street, city and state, or his zip code when she/he makes the food search request from the diner device 110.

Alternatively, the target address is a GPS location of the diner device 112. The GPS location can be obtained, for example, using HTML5 code of the search web page provided by the server 102 and displayed on the diner device 112. When the diner 110 request a search, the search web page retrieves the search terms entered by the diner 110 and the GPS location, and send them to the server 102. If the target address is not provided by the diner 110, at 1004, the server software application determines the target address using the IP address of the diner device 112. For example, the server software application queries a map service server (not shown) to determine the diner's 110 address based on the IP address of the diner device 112. The IP address can be determined from the HTTP or HTTPS based search request. The diner's 110 address is then viewed as the target address of the food search.

At 1006, the server software application determines the physical search range in which restaurants are searched for matching the search terms. For example, the search range for the food search request is a ten mile radius from the target address. All restaurants in the range are target restaurants for the food search request.

At 1008, the server software application determines the search intent of the diner based on the search terms. For example, if the name of a restaurant within the search range appears in the search terms, the search intent is to order food from this restaurant. As an additional example, at 1008, the server software application determines whether a dish, a dish attribute and/or a dish ingredient are present in the search terms. If so, the search intent includes the particular dish, dish attribute and/or dish ingredient.

Figure 18:
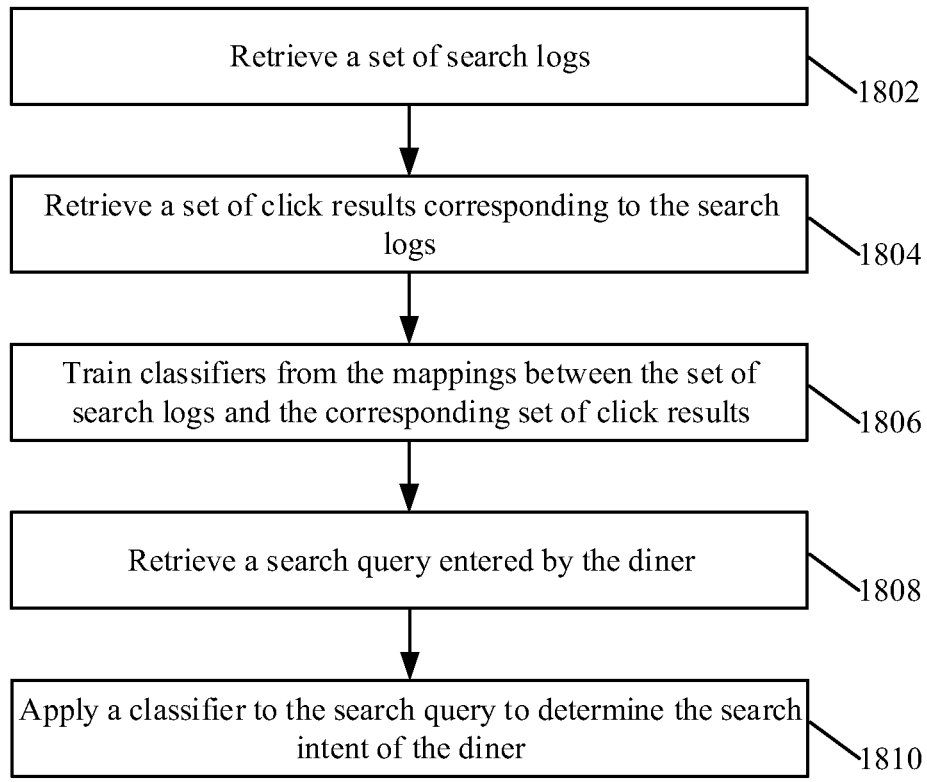
FIG. 18 is a flow chart depicting a process by which a restaurant server determines the search intent from a search query in accordance with the teachings of this disclosure.

In a different implementation, the search intent is determined by a query analysis process, such as machine learning process. The query analysis is further illustrated by reference to FIG. 18. Turning to FIG. 18, a flow chart depicting a process by which the server software application programs and actuates the server 102 to determine the search intent from search query (also referred to herein as a search log) is shown and generally indicated at 1800. At 1802, the server software application retrieves a set of search logs from the database 104. At 1804, the server software application retrieves a corresponding set of click results from the database 104. A click result corresponding to a search log indicates a restaurant, one or more dishes, or one or more menu items that a diner clicks on a web page provided by the server software application after the diner submits her search terms of the search log. Click results are stored in the database 104. The corresponding click result and search log are indicated in the database 104 as a mapping as well. Accordingly, at 1804, the set of mappings are retrieved from the database 104. Each search log-click result mapping is a question and answer dataset.

At 1806, the server software application trains classifiers from the set of search log-click result mappings. In one implementation, the classifiers are location dependent. For example, one classifier is trained for each marketing area, such as a city or a village. At 1808, the server software application retrieves a search query from, for example, the device 112. At 1810, the server software application applies the classifier corresponding to a location where the diner 110 is located to the retrieved search query to determine the search intent of the diner. In one implementation, the classifier indicates more than one search intent. For example, if the diner 110 is searching for "Hummus." In other words, the search query is "Hummus." In such a case, the process 1800 generate two suggestions 1) Hummus as a restaurant; and 2) Hummus as a dish as the search intent. If a Hummus restaurant exists in the local area of the diner 110, Hummus as a restaurant is assigned to a higher rank.

Figure 11:
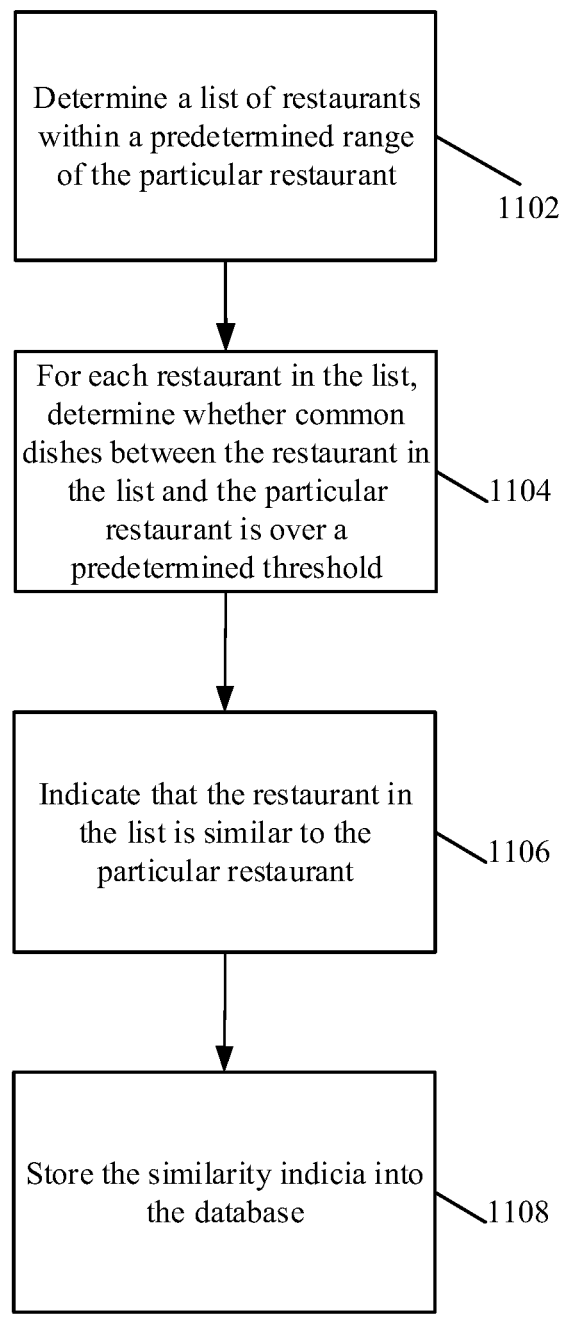
FIG. 11 is a flowchart depicting a process by which a restaurant service system food searching to a diner in accordance with the teachings of this disclosure.

Turning back to FIG. 10, at 1010, if the search intent includes a particular restaurant, the server software application adds restaurants similar to the intended particular restaurant in the food search. The added similar restaurants are also target restaurants. Similarity between restaurants is determined by a process 1100 as shown in FIG. 11. The process 1100 can be periodically performed as a background process to establish and update restaurant similarity. It is run for each restaurant of a selected set of restaurants or all restaurants in the database 104. Turning now to FIG. 11, at 1102, for a particular restaurant, the server software application determines a list of restaurants that are within a predetermined range (such as ten or twenty miles) from the particular restaurant. At 1104, for each restaurant in the list, the server software application determines whether the common dishes between the restaurant in the list and the particular restaurant is over a predetermined threshold. If so, at 1106, the server software application indicates that the restaurant in the list and the particular restaurant are similar restaurants. In a further implementation, cuisine type, price point and attributes (such as vegetarian, vegan, kosher, diners, etc.) along with common dishes are used to determine the restaurant similarity.

At 1108, this restaurant similarity indicia is also stored into the database 104. The common dishes are common to the set of dishes mapped to from the menu items of the restaurant in the list and the set of dishes mapped to from the menu items of the particular restaurant. The predetermined threshold can be an integer number (such as ten or twenty) or a percentage (such as 60%). In the latter case, if the common dishes are over 60% of the first set and the common dishes are over 60 of the second set, it is said that the restaurant in the list and the particular restaurant are similar restaurants. In an alternate implementation, ordered dishes, not all dishes, in the last N (such as 365 or 730) days of the restaurant in the list and the particular restaurant are considered for the similarity determination.

Turning back to FIG. 10, at 1012, the server software application searches the database 104 for dishes, menu items and restaurants matching the search intent within the target restaurants. At 1014, the server software application orders the search results. For example, dishes and menu items offered by similar restaurants are ranked higher in the search result list. As an additional example, dishes with higher popularity rank are ranked higher in the search result list. In a further implementation, dishes and menu items from restaurants that are specialized or popular in dishes matching the search intent are ranked higher in the search result list. For example, when the search intent is salad, restaurants specializing in salad or providing the most popular salads (such as salads that are most frequently ordered) are ranked higher in the list.

Figure 19:
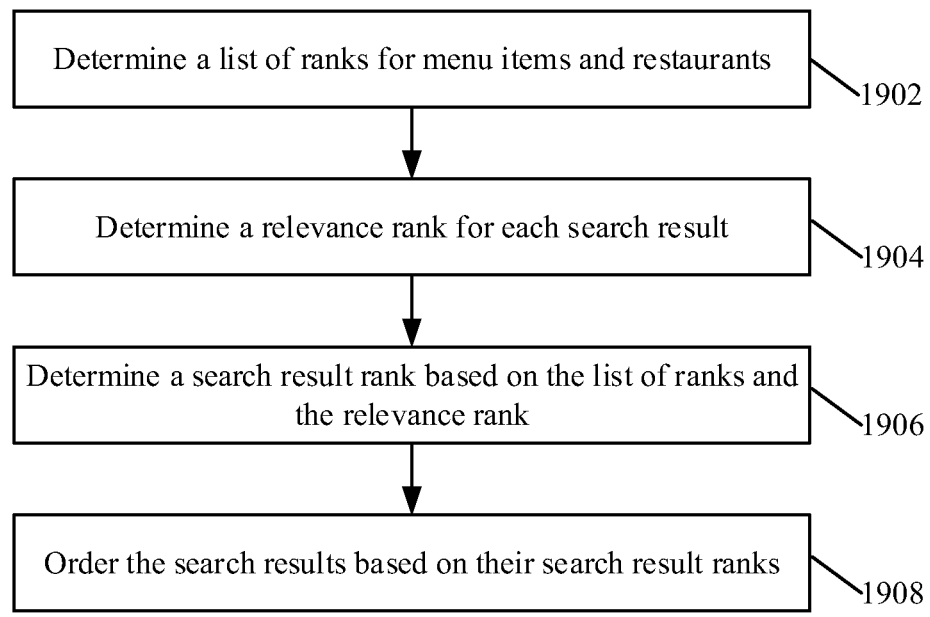
FIG. 19 is a flow chart depicting a process by which a restaurant server orders a list of search results in accordance with the teachings of this disclosure.

An illustrative method for ordering the search results is shown by reference to FIG. 19. Referring now to FIG. 19, a flow chart depicting a process 1900 by which the server software application orders the search results is shown. At 1902, the server software application determines a list of ranks for menu items and restaurants. For example, a popularity rank and a conversion rank are determined for each restaurant and each menu item. The popularity rank indicates how frequent a menu item is ordered. For example, the popularity rank is the number of times it is ordered within a day, a week, a month, etc. The popularity rank can also indicate how frequent food is ordered from a particular restaurant. A conversion rank indicates how often a menu item is ordered after it is presented as a search result to diners. For example, the conversion rank is a percentage calculated as the quotient of the number of time it is ordered and the number of times it is presented as a search result within a predetermined time period, such as a week. The list of ranks for each menu item or restaurant is, in one implementation, determined by a background process, and stored into the database 104. In such a case, at 1902, the list of ranks is retrieved from the database 104 if the corresponding menu item or restaurant is a search result.

At 1904, the server software application determines a relevance rank for each search result, which is a menu item or a restaurant. In one implementation, the relevance rank is determined based on term matching. For example, term matching in menu item or dish title field is assigned a higher relevance rank than that in a menu item description field. The relevance rank is derived using, for example, machine learning algorithms based on search log and other date. At 1906, the server software application determines a search result rank based on the list of ranks and the relevance rank for each search result. For instance, the search result rank is a weighted average of the list of ranks and the relevance rank. At 1908, the server software application orders the search results based their search result ranks.

Turning back to FIG. 10, at 1016, the server software application returns the ordered search result list to the diner device 112. It should be noted that each search result in the list include a menu item, the dish corresponding to the menu item, the dish attributes, the dish ingredients and the dish's popularity rank. The diner device 112 then displays the search result list with the dish and the dish attributes presented as facets and filters for further browsing the search results. A sample screen 1200 of the search result list is shown in FIG. 12. Referring to FIG. 12, the search terms for the sample screenshot 1200 is "Chipotle." The search term "Chipotle" is entered on the diner device 112, and received by the restaurant server 102 from the diner device 112 over the network 106. In response, the server software application searches the database 104 for restaurants, menu items and dishes matching the search term. The illustrative search result list includes two restaurants 1202 and ten menu items 1204. For each restaurant 1202, name, location, distance from the diner 110, delivery time frame, cuisine type (i.e. Mexican), menu link and most popular dishes and other information are shown. The most popular dishes are orders by their popularity ranks.

For each menu item 1204, menu item title, price, description, servicing restaurant, dish and other information are shown. In addition to the restaurants 1202 and menu items 1204, a collection of facet and filter groups are shown at 1206, 1208, 1210 and 1212. The facet groups 1206-1212 allow the diner 110 to refine his food search by narrowing the scope of restaurants and menu items. For example, selecting the "Healthy" search refinement option of the facet group 1210 will cause the diner device 112 to request dishes within the search result list 1200 from the server 102 that have the dish attribute "Healthy." The facet and filter groups 1206-1212 provide rich navigation and browsing capabilities for the diner 110.

Each search and browsing refinement options provided by the facet and filter groups 1206-1212 correspond to a food taxonomy node property. For example, each refinement option under the facet group 1210 corresponds a dish attribute. These refinement options are ranked based on how often they are clicked by diners, such as the diner 110. Each time a refinement option (meaning a facet) is clicked, the server software application logs the click into the database 104. In other words, the server software application tracks diner clicks on the facets and other elements of the screen 1200.

Diner's clicks on dishes, restaurants and facets are feedback to the service system 100. The server software application or a background process then analyzes diner feedback, such as clicks on facets, to update facet ranks. The updated facet ranks are stored in the database 104. Thereafter, the updated ranks of facets are displayed for diners when they search for food.

Figure 13:
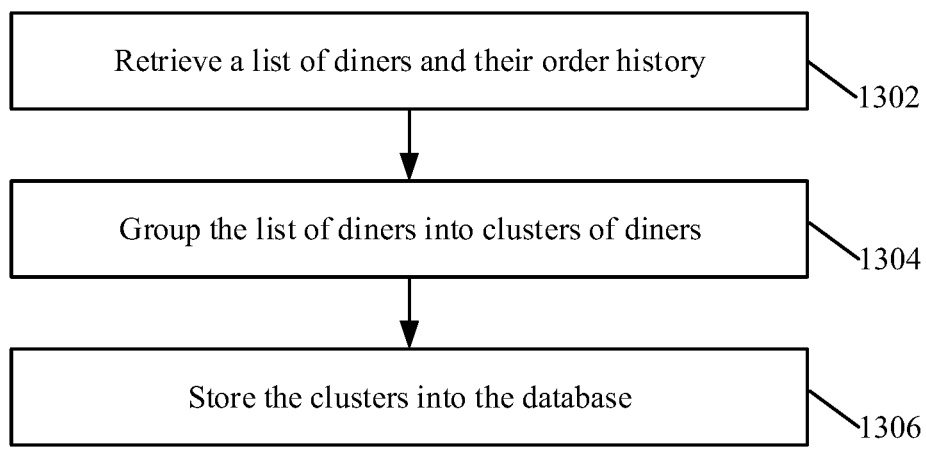
FIG. 13 is a flowchart depicting a process by which a restaurant server groups similar diners into a diner cluster in accordance with the teachings of this disclosure.
Figure 14:
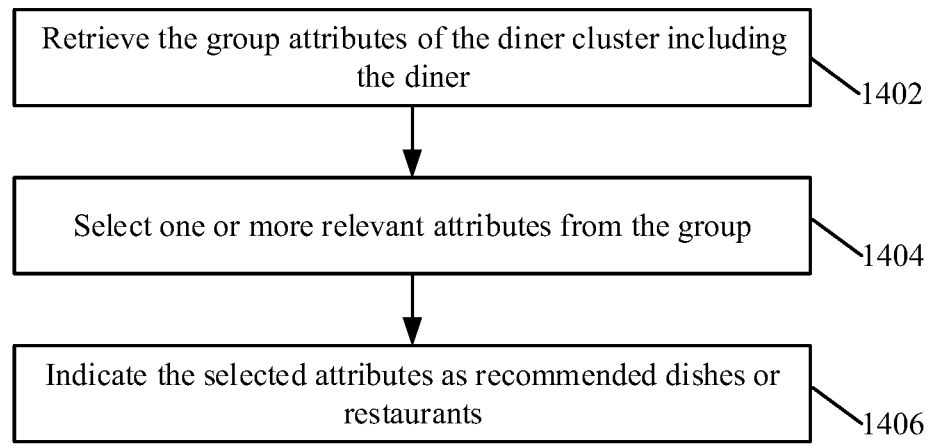
FIG. 14 is a flowchart depicting a process by which a restaurant server determines a list of recommended dishes and menu items for a diner in accordance with the teachings of this disclosure.

Turning back to FIG. 10, at 1018, the server software application determines a list of recommended dishes and menu items based on the search intent. At 1020, the recommended list of dishes and menu items are sent to the diner device 112. The diner device 112 then receives and displays the recommendation list to the diner 110. In one implementation, dish recommendation is based on order patterns of similar diner clusters as shown in FIGS. 13 and 14. Each diner cluster includes a plurality of diners.

Referring to FIG. 13, a flowchart depicting a process 1300 by which the server software application determines diner clusters based on diner's order history is shown. At 1302, the server software application retrieves a list of diners (such as all diners or a subset thereof) and their order histories from the database 104. A diner's order history indicates the diner's orders, menu items and corresponding dishes in each order, the serving restaurant of each order, each menu item quantity and price of each order, order time of each order, delivery method of each order, and/or other order information. At 1304, the server software application runs a clustering algorithm on the retrieved diner data and order history data to group similar diners into different diner clusters (also referred to herein as diner groups).

Each diner cluster includes one or more diners, and has a number of cluster properties that include similar dishes, restaurants and cuisine type (such as Japanese food and Italian food). The cluster properties are also referred to herein as diner cluster attributes and diner group attributes. Different clustering algorithms, such as hierarchical clustering, k-means algorithm or multivariate normal distribution, can be utilized to generate the diner clusters. In one implementation, each diner is determined to belong to a diner cluster or not. In a different implementation, each diner is determined to belong to each diner cluster to a certain degree, meaning the likelihood of belonging to the cluster. At 1306, the server software application stores each diner cluster and its properties into the database 104. Each diner in a diner cluster is associated with the diner cluster. It should be noted that the clustering process 1300 can be periodically (such as daily, weekly or monthly) run as a background process.

Referring to FIG. 14, a flowchart depicting a process by which the server software application determines a list of recommended dishes, menu items or restaurants when the diner 110 searches for food by accessing the system 100 is shown and generally indicated at 1400. At 1402, the server software application retrieves the group attributes of the diner cluster that includes the diner 110. In one implementation, the identity of the diner 110 is determined based on the login credentials (such as user name or Email address) of the diner 100. Alternatively, the identity of the diner 110 is determined from an Internet browser cookie. At 1404, the server software application selects one or more properties of the diner cluster. For example, when the diner 110 is searching for a dish, at 1404, one or more dish attributes of the group attributes are selected. At 1406, the server software application indicates that the selected attributes as the recommended dishes or restaurants. The recommended dishes or restaurants are then sent to the diner device 112, which displays the recommended dishes or restaurants on its screen.

The recommendation process 1400 can be run when the diner 110 searches for good or accesses a home web page of the system 100. For example, when the diner 110 uses the diner device 112 to load a home web page provided by the server software application, the server software application identifies the dinner 110 and runs the process 1400 to generate recommendations for the diner 110. The recommended dishes or restaurants are displayed on the home page. As an additional example, recommendations are generated from the process 1400 for a set of diners (such as all diners in the database 104) and sent to the set of diners in Email messages.

Obviously, many additional modifications and variations of the present disclosure are possible in light of the above teachings. Thus, it is to be understood that, within the scope of the appended claims, the disclosure may be practiced otherwise than is specifically described above. For example, the functions of the server software application running on the restaurant server 102 are implemented and performed by more than one server software application running on the same or different servers. For instance, one separate software application is dedicated to train dish classifiers. As an additional example, data in the database 104 resides in the memory of the server 102. As still a further example, the server 102 includes multiple network interfaces. One of the multiple network interfaces can be dedicated for communication with the database 104.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer system for maintaining and using a dish hierarchy for menu management and food ordering, the computer system comprising:
    a server including one or more processors;
    a non-transitory computer-readable storage media that is communicatively coupled to the one or more processors and storing one or more sequences of instructions which, when executed by the one or more processors, cause the one or more processors to:
        store a dish hierarchy having multiple dish nodes at a plurality of levels, each dish node having one or more properties corresponding to one or more of a common plurality of attributes, the dish hierarchy comprising a plurality of menu items having been received from a first restaurant and mapped to one or more of the multiple dish nodes according to a set of values corresponding to a set of the common plurality of attributes, the plurality of menu items including a first menu item that is mapped to a specific dish node;
        receive a set of search terms from a diner communication device;
        identify a list of dish nodes of the multiple dish nodes having properties matching the set of search terms, the list of dish nodes including the specific dish node;
        send instructions for presenting, by the diner communication device, a graphical user interface (GUI) that is configured to show data related to a list of menu items that are mapped to the list of dish nodes and a list of attributes of the common plurality of attributes for user selection, the list of attributes being used to filter the list of menu items;
        receive a food order including the first menu item from the diner communication device;
        send the food order to the first restaurant communication device.

2. The system of claim 1, the common plurality of attributes including a list of dish ingredients, a preparation method, a cuisine type, a healthy option, or a rating.

3. The computer system of claim 1, the one or more sequences of instructions further causing the one or more processors to:
    identify one of the set of search terms that does not appear in the one or more properties of the specific dish node;
    update the one or more properties of the specific dish node with the one search term.

4. The computer system of claim 1, the one or more sequences of instructions further causing the one or more processors to:
    select a list of values that are shared by all menu items that are mapped to the specific dish node;
    update the one or more properties of the specific dish node with the list of values.

5. The computer system of claim 1,
    the plurality of menu items further including a second menu item, and
    the one or more sequences of instructions further causing the one or more processors to:
    calculate an accumulative rank for the third menu item based on a menu rank, a search rank, and a food order rank;
    create a new dish node in the dish hierarchy and mapping the second menu item to the new dish node when the accumulative rank for the second menu item is above a threshold.

6. The computer system of claim 1, the identifying comprising determining a list of ranks for the list of menu items, including a popularity rank, a conversion rank, or a relevance rank, and
    the GUI further configured to show the data related to the list of menu items based on the list of ranks.

7. The computer system of claim 1, the GUI further configured to show the data related to the list of attributes based on a current list of click ranks,
    the one or more sequences of instructions further causing the one or more processors to:
    receive a click or a selection of one of the list of attributes via the GUI;
    update the current list of click ranks based on the click.

8. The computer system of claim 1, the one or more sequences of instructions further causing the one or more processors to:
    assign the diner communication device into one of a plurality of clusters based on order histories associated with diner communication devices from which food orders have been received;

identify an order pattern from the one cluster;
send a recommendation for food to order based on the order pattern to the diner communication device.

9. The computer system of claim 1, the one or more sequences of instructions further causing the one or more processors to:
determine a diner intent associated with the set of search terms;
identify, when the diner intent indicates a restaurant, a list of restaurants having descriptions matching the set of search terms, the list of restaurants being associated with a plurality of restaurant communication devices form which menu items have been received, and
the GUI further configured to show additional data related to the list of restaurants for user selection.

10. The computer system of claim 9, determine the diner intent being based on a search log showing search terms and corresponding selections of a restaurant or a menu item from search results.

11. A computer-implemented method of maintaining and using a dish hierarchy for menu management and food ordering, the method comprising:
storing a dish hierarchy having multiple dish nodes at a plurality of levels, each dish node having one or more properties corresponding to one or more of a common plurality of attributes, the dish hierarchy comprising a plurality of menu items having been received from a first restaurant and mapped to one or more of the multiple dish nodes according to a set of values corresponding to a set of the common plurality of attributes, the plurality of menu items including a first menu item that is mapped to a specific dish node;
receiving a set of search terms from a diner communication device;
identifying a list of dish nodes of the multiple dish nodes having properties matching the set of search terms, the list of dish nodes including the specific dish node;
sending instructions for presenting, by the diner communication device, a graphical user interface (GUI) that is configured to show data related to a list of menu items that are mapped to the list of dish nodes and a list of attributes of the common plurality of attributes for user selection, the list of attributes being used to filter the list of menu items;
receiving a food order including the first menu item from the diner communication device; and
sending the food order to the first restaurant communication device.

12. The computer-implemented method of claim 11, the common plurality of attributes including a list of dish ingredients, a preparation method, a cuisine type, a healthy option, or a rating.

13. The computer-implemented method of claim 11, the method further comprising:
identifying one of the set of search terms that does not appear in the one or more properties of the specific dish node;
updating the one or more properties of the specific dish node with the one search term.

14. The computer-implemented method of claim 11, the method further comprising:
selecting a list of values that are shared by all menu items that are mapped to the specific dish node;
updating the one or more properties of the specific dish node with the list of values.

15. The computer-implemented method of claim 11, the method further comprising:
the plurality of menu items further including a second menu item,
calculating an accumulative rank for the second menu item based on a menu rank, a search rank, and a food order rank;
creating a new dish node in the dish hierarchy and mapping the second menu item to the new dish node when the accumulative rank for the second menu item is above a threshold.

16. The computer-implemented method of claim 11,
the identifying comprising determining a list of ranks for the list of menu items, including a popularity rank, a conversion rank, or a relevance rank,
the GUI further configured to show the data related to the list of menu items based on the list of ranks.

17. The computer-implemented method of claim 11, the method further comprising:
the GUI further configured to show the data related to the list of attributes based on a current list of click ranks,
receiving a click or a selection of one of the list of attributes via the GUI;
updating the current list of click ranks based on the click.

18. The computer-implemented method of claim 11, the method further comprising:
assigning the diner communication device into one of a plurality of clusters based on order histories associated with diner communication devices from which food orders have been received;
identifying an order pattern from the one cluster;
sending a recommendation for food to order based on the order pattern to the diner communication device.

19. The computer-implemented method of claim 11, the method further comprising:
determining a diner intent associated with the set of search terms;
identifying, when the diner intent indicates a restaurant, a list of restaurants having descriptions matching the set of search terms,
the list of restaurants being associated with a plurality of restaurant communication devices form which menu items have been received,
the GUI further configured to show additional data related to the list of restaurants for user selection.

20. The computer-implemented method of claim 11, determining the diner intent being based on a search log showing search terms and corresponding selections of a restaurant or a menu item from search results.

* * * * *